(12) United States Patent
Chen et al.

(10) Patent No.: US 10,489,484 B2
(45) Date of Patent: Nov. 26, 2019

(54) MATRIX MULTIPLICATION ON A SYSTOLIC ARRAY

(71) Applicant: International Business Machines Corporation, Armonk, NY (US)

(72) Inventors: Chia-Yu Chen, White Plains, NY (US); Jungwook Choi, Elmsford, NY (US); Kailash Gopalakrishnan, San Jose, CA (US); Victor Han, San Diego, CA (US); Vijayalakshmi Srinivasan, New York, NY (US); Jintao Zhang, Princeton, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/381,530

(22) Filed: Apr. 11, 2019

(65) Prior Publication Data
US 2019/0236113 A1      Aug. 1, 2019

Related U.S. Application Data

(63) Continuation of application No. 15/842,422, filed on Dec. 14, 2017, now Pat. No. 10,261,978, which is a
(Continued)

(51) Int. Cl.
*G06F 17/16*      (2006.01)
(52) U.S. Cl.
CPC ................... *G06F 17/16* (2013.01)
(58) Field of Classification Search
CPC ........................................... G06F 17/16
(Continued)

(56) References Cited

U.S. PATENT DOCUMENTS

| | | | | |
|---|---|---|---|---|
| 4,493,048 A | * | 1/1985 | Kung | G06F 15/8046 708/420 |
| 4,686,645 A | * | 8/1987 | McCanny | G06F 15/8046 708/620 |

(Continued)

FOREIGN PATENT DOCUMENTS

WO     2016/186811 A1    11/2016

OTHER PUBLICATIONS

Matej Zajc, "Systolic Parallel Processing", Lecture Notes from "Algorithms and architectures of multimedia systems", University of Ljubljana, 2011 (Year: 2011).*

(Continued)

*Primary Examiner* — Matthew D Sandiefer
(74) *Attorney, Agent, or Firm* — Amin, Turocy & Watson, LLP

(57) ABSTRACT

Techniques facilitating matrix multiplication on a systolic array are provided. A computer-implemented method can comprise populating, by a system operatively coupled to a processor, respective first registers of one or more processing elements of a systolic array structure with respective input data bits of a first data matrix. The one or more processing elements can comprise a first processing element that comprises a first input data bit of the first data matrix and a first activation bit of a second data matrix. The method can also include determining, by the system, at the first processing element, a first partial sum of a third data matrix. Further, the method can include streaming, by the system, the first partial sum of the third data matrix from the first processing element.

20 Claims, 18 Drawing Sheets

Related U.S. Application Data continuation of application No. 15/460,755, filed on Mar. 16, 2017, now Pat. No. 10,241,972.

(58) Field of Classification Search
USPC .................................. 708/514, 520, 607
See application file for complete search history.

(56) References Cited

U.S. PATENT DOCUMENTS

| | | | | |
|---|---|---|---|---|
| 4,777,614 A * | 10/1988 | Ward | ............... | G06F 7/525 |
| | | | | 708/607 |
| 5,081,573 A * | 1/1992 | Hall | ............... | G06F 17/16 |
| | | | | 712/6 |
| 5,274,832 A * | 12/1993 | Khan | ............... | G06N 3/10 |
| | | | | 708/424 |
| 5,317,755 A * | 5/1994 | Hartley | ............... | G06F 15/8046 |
| | | | | 341/101 |
| 5,659,780 A * | 8/1997 | Wu | ............... | G06F 15/8015 |
| | | | | 708/315 |
| 6,041,398 A | 3/2000 | Pechanek et al. | | |
| 6,405,185 B1 * | 6/2002 | Pechanek | ............... | G06F 15/8023 |
| | | | | 706/14 |
| 8,924,455 B1 * | 12/2014 | Barman | ............... | G06F 7/5443 |
| | | | | 708/607 |
| 9,747,546 B2 * | 8/2017 | Ross | ............... | G06F 15/8046 |
| 2015/0081752 A1 * | 3/2015 | Maeda | ............... | G06F 17/16 |
| | | | | 708/520 |
| 2016/0342892 A1 | 11/2016 | Ross | | |

OTHER PUBLICATIONS

Mehdi Zargham, "Data Flow and Systolic Array Architectures", Chapter 8 from "Computer Architecture", Prentice Hall, 1996 (Year: 1996).*

K. T. Johnson, A. R. Hurson and B. Shirazi, "General-purpose systolic arrays," in Computer, vol. 26, No. 11, pp. 20-31, Nov. 1993 (Year: 1993).*

De Groot et al., "Efficient Bit-Level, Word-Level, and Block-Level Systolic Arrays for Matrix-Matrix Multiplication", Proc. SPIE 0880, High Speed Computing, Apr. 1988 (Year: 1988).*

Peddawad et al., "Matrix-Matrix Multiplication Using Systolic Array Architecture in Bluespec", CS6230: CAD for VLSI, Systolic Array & Bluespec, Oct. 25, 2015, pp. 1-8.

Author Unknown, "Chapter 8: Data Flow and Systolic Array Architectures", last accessed on Jan. 5, 2017, 19 pages.

Zajc, Matej, "Systolic Parallel Processing", Algorithms and architectures of multimedia systems, Lecture Notes, University of Ljubljana, 2011, pp. 1-58.

Johnson et al., "General-Purpose Systolic Arrays", Computer, vol. 26, No. 11, Nov. 1993, pp. 20-31.

Groot et al., "Efficient Bit-Level, Word-Level, and Block-Level Systolic Arrays for Matrix-Matrix Multiplication", High Speed Computing, Proceeding of SPIE, vol. 880, Apr. 1988, pp. 107-115.

Non-Final Office Action received for U.S. Appl. No. 15/460,755 dated Apr. 5, 2018, 39 pages.

Non-Final Office Action received for U.S. Appl. No. 15/842,422 dated Apr. 11, 2018, 38 pages.

Final Office Action received for U.S. Appl. No. 15/460,755 dated Jul. 23, 2018, 35 pages.

Final Office Action received for U.S. Appl. No. 15/842,422 dated Jul. 23, 2018, 27 pages.

Non-Final Office Action received for U.S. Appl. No. 15/842,422 dated Nov. 2, 2018, 20 pages.

Notice of Allowance received for U.S. Appl. No. 15/460,755 dated Nov. 7, 2018, 25 pages.

List of IBM Patents or Applications Treated as Related.

* cited by examiner

MATRIX MULTIPLICATION ON A SYSTOLIC ARRAY

BACKGROUND

The subject disclosure relates to matrix multiplication, and more specifically, facilitating matrix multiplication on a systolic array.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate performing matrix multiplication on a systolic array are described.

According to an embodiment, a computer-implemented method can comprise populating, by a system operatively coupled to a processor, respective first registers of one or more processing elements of a systolic array structure with respective input data bits of a first data matrix. The one or more processing elements can comprise a first processing element that can comprise a first input data bit of the input data bits of the first data matrix and a first activation bit of a second data matrix. The systolic array structure can comprise a first dimension and a second dimension of the one or more processing elements. The computer-implemented method can also comprise determining, by the system, at the first processing element, a first partial sum of a third data matrix based on a first sum that can comprise a first product and a first initial value of the third data matrix. The first product can be determined based on the first activation bit and the first input data bit. Further, the computer-implemented method can comprise streaming, by the system, the first partial sum of the third data matrix from the first processing element and along the second dimension.

According to an embodiment, a system can comprise a memory that stores computer executable components and a processor that executes computer executable components stored in the memory. The computer executable components can comprise a load manager component that can populate respective first registers of one or more processing elements of a systolic array structure with respective input data bits of a first data matrix. The load manager component further can input a first activation bit of a second data matrix into a first processing element of the one or more processing elements. The computer executable components can also comprise a computation component that can determine, at the first processing, a first partial sum of a third data matrix based on a first product of the first activation bit and a first input data bit of the first data matrix, and a first initial value of the third data matrix. Further, the computer executable components can also comprise a shift manager component that can stream the first partial sum of the third data matrix along a first dimension to a second processing element of the one or more processing elements.

According to another embodiment, a computer program product for facilitating matrix multiplication on a systolic array can comprise a computer readable storage medium having program instructions embodied therewith. The program instructions are executable by a processing component. The program instructions can cause the processing component to determine, at a first processing element of one or more processing elements of a systolic array structure, a first partial sum of a first data matrix. The first partial sum can be based on a first activation bit of a second data matrix multiplied by a first input bit of a third data matrix. The first input bit can be stored in a first register of the first processing element The program instructions can also cause the processing component to stream the first partial sum of the first data matrix to a second processing element of the one or more processing elements. The second processing element can be located along a first dimension of the systolic array structure.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

The various aspects provided herein relate to matrix multiplication on a systolic array. A systolic array can comprise a homogeneous network of tightly coupled processing elements (e.g., data processing elements, central processing units, or cells). The one or more processing elements can independently compute a partial result as a function of data received from upstream neighbors, store the results within itself (e.g., within an internal register), and pass the result downstream. For purposes of explanation, the four directions (north, south, east, and west) will be utilized herein for purposes of simplicity. Thus, the upstream processing elements are the elements to the left (e.g., west) and above (e.g., north) a particular processing element and the downstream processing elements are the elements to the right (e.g., east) or below (e.g., south) the particular processing element. Accordingly, data can flow from north to south and from west to east.

Matrix multiplication is a highly data intensive problem. The matrix multiplication provided herein can be performed with data reuse on a systolic array with minimal overhead. In an implementation, the systolic array can be a rectangular systolic array. However, the various aspects are not limited to this implementation and a systolic array having other geometries can be utilized with the disclosed aspects.

Figure 1:
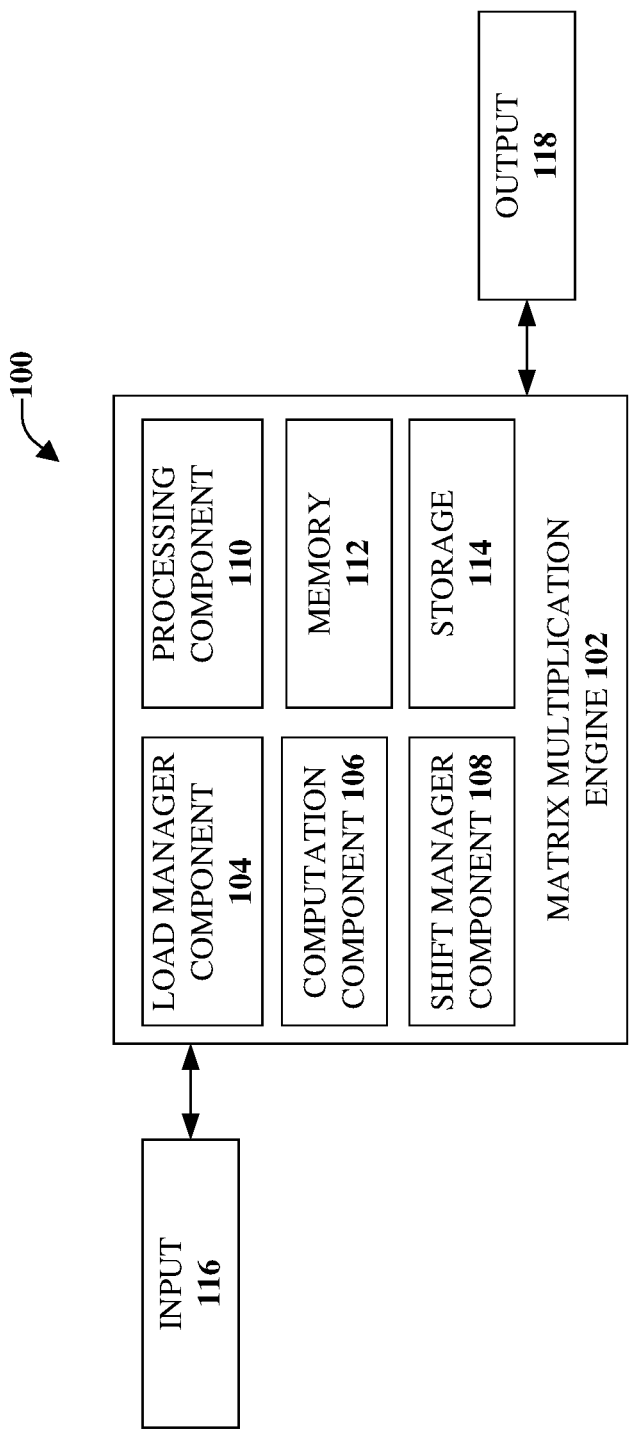
FIG. 1 illustrates a block diagram of an example, non-limiting system that facilitates matrix multiplication on a systolic array in accordance with one or more embodiments described herein.

FIG. 1 illustrates a block diagram of an example, non-limiting system 100 that facilitates matrix multiplication on a systolic array in accordance with one or more embodiments described herein. Aspects of systems (e.g., non-limiting system 100 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

In various embodiments, non-limiting system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise non-limiting system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated, non-limiting system 100 can comprise a matrix multiplication engine 102 that can include a load manager component 104, a computation component 106, a shift manager component 108, a processing component 110, a memory 112, and/or a storage 114. In some embodiments, one or more of the matrix multiplication engine 102, the load manager component 104, the computation component 106, the shift manager component 108, the processing component 110, the memory 112, and/or the storage 114 can be communicatively and/or operatively coupled to one another to perform one or more functions of the non-limiting system 100.

The matrix multiplication engine 102 can facilitate solving simultaneous linear equations and, specifically, a large-scale linear system of equations. The matrix multiplication engine 102 can utilize a systolic array in order to provide the efficient matrix multiplication. The matrix multiplication engine 102 can utilize the systolic array design that performs the computation C=A×B, where A, B, and C are respective arrays, $$A = \begin{pmatrix} a_{11} & a_{12} & a_{1M} \\ a_{21} & a_{22} & a_{2M} \\ a_{N1} & a_{N2} & a_{NM} \end{pmatrix}$$

$$B = \begin{pmatrix} b_{11} & b_{12} & b_{1M} \\ b_{21} & b_{22} & b_{2M} \\ b_{N1} & b_{N2} & b_{NM} \end{pmatrix}$$

$$C = \begin{pmatrix} c_{11} & c_{12} & c_{1M} \\ c_{21} & c_{22} & c_{2M} \\ c_{N1} & c_{N2} & c_{NM} \end{pmatrix}$$

One or more inputs 116 to the matrix multiplication engine 102 can include one or more the input data bits of a first input matrix and/or one or more activation bits of a second input matrix. In accordance with an implementation, the input data bits can be associated with Matrix A and the activation bits can be associated with Matrix B. According to another implementation, the input data bits can be associated with Matrix B and the activation bits can be associated with Matrix A.

According to an implementation, one of the input matrices (e.g., Matrix A or Matrix B) can be retained in the registers of the array instead of partial results of Matrix C. If Matrix A data values are retained in the registers, Matrix B and Matrix C can be streamed and Matrix A can be reused for as many columns of Matrix B and Matrix C as desired without encountering the overhead of putting Matrix C in and taking Matrix C out for tiling. In a similar manner, if Matrix B data values are retained in the registers, Matrix A and Matrix C can be streamed and Matrix B can be reused for as many rows of Matrix A and Matrix C as desired without encountering the overhead of putting Matrix C in and taking Matrix C out for tiling purposes.

Figure 2:
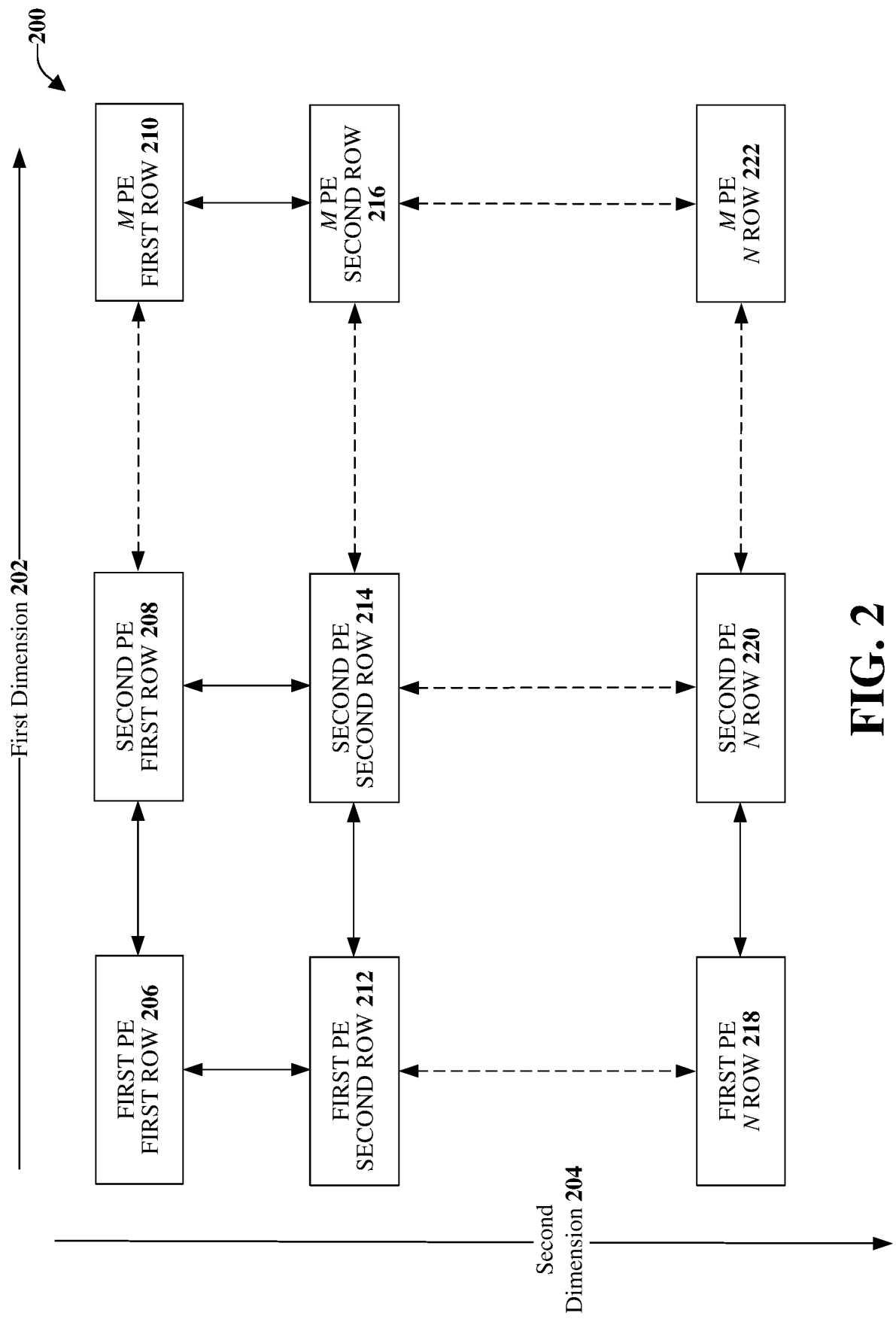
FIG. 2 illustrates a simplified representation of a non-limiting example architecture of a systolic array in accordance with one or more embodiments described herein.

With reference also to FIG. 2, illustrated is a simplified representation of a non-limiting example architecture of a systolic array 200 in accordance with one or more embodiments described herein. The systolic array 200 can include two dimensions, illustrated as a first dimension 202 and a second dimension 204. As illustrated, the first dimension 202 can correspond to columns of processing elements (PEs) and the second dimension 204 can correspond to rows of processing elements. However, according to an alternative implementation (not shown), the first dimension can correspond to the rows of processing elements and the second dimension can correspond to the columns of processing elements.

The systolic array 200 can include multiple cells or processing elements (PEs). For example, a first row (e.g., row 0) in the systolic array 200 can include a first processing element 206, a second processing element 208, through an M processing element 210, where M is an integer that represents the number of columns. A second row (e.g., row 1) in the systolic array 200 can include a first processing element 212, a second processing element 214, through an M processing element 216. The rows of the systolic array 200 can continue in this matter until the final row (e.g., row N), which can include a first processing element 218, a second processing element 220, through an M processing element 222, where N is an integer that represents the number of rows. According to various implementations, the systolic array 200 can have an equal number of rows and columns, more rows than columns, or more columns than rows.

Convolution can be implemented as generic matrix multiplication: $C=\alpha AB+\beta Ci$. Where $\alpha$ and $\beta$ are constants and $Ci$ is an initial matrix. To obtain $\alpha AB$, multiply B matrix values by $\alpha$ as the values are passed/stored into the systolic array registers with no extra overhead. To obtain $\beta Ci$, one processing element can initially multiply $\beta$ to one or more new rows of C values the first time the values go through the systolic array (e.g., first pass in the inner dimension).

Matrix multiplication is a binary operation that produces a matrix from two matrices. In further detail, if A is an n×m matrix and B is an m×p matrix, the matrix product AB is an n×p matrix. In the n×p matrix, the m entries across a row of A can be multiplied with the m entries down columns of B and summed to produce an entry of AB. Generic matrix multiplication is widely utilized and the various aspects provided herein provide efficient matrix multiplication.

When two input matrices (e.g., A and B) are streamed into two perpendicular edges of a systolic array (e.g., the west edge and the north edge), one or more elements in the resulting matrix can be mapped to a single corresponding processing element. For example, Matrix A can be streamed from north to south (e.g., along the second dimension 204) and Matrix B can be streamed from west to east (e.g., along the first dimension 202). In an alternative example, Matrix A can be streamed from west to east and Matrix B can be streamed from north to south. However, a problem associated with streaming matrices A and B in this manner is that to meet cache bandwidth limitations different sets of rows and columns of the input matrices are reused to produce different output matrix values. Although with a large enough output matrix size, this might exceed the systolic array's on chip storage's bandwidth limitation, resulting in undesired overhead. For example, whenever a set of rows or columns is reused, the output matrix values are first extracted from the systolic array and then new respective output matrix partial sums are loaded into the systolic array before operation can continue.

The various aspects provided herein provide methods for accumulating matrix multiplication partial sums (e.g., the partial values of Matrix C) that can be pumped or streamed through the systolic array. The partial values of Matrix C can be streamed through the array in place of the input matrices (e.g., Matrix A, Matrix B). Continuously streaming the output matrix (e.g., Matrix C) through the array instead of taking the time to separately put the partial values of Matrix C into the respective registers and then take out the partial values of Matrix C from the respective registers without useful calculations being performed, can facilitate achievement of a more efficient use of the processing elements in the systolic array.

For example, the output from the first processing element 218 of Row N (e.g., a first partial value of Matrix C) can be extracted (e.g., from the south) and loaded into Row 0 first processing element 206. In a similar manner, the output from the second processing element 220 (e.g., a second partial value of Matrix C) can be exacted (from the south) and loaded into the second processing element 208. This process occurs for the one or more processing elements in Row N, through M processing element, whose partial C Matrix value can be extracted and input into Row 0, M processing element 210.

Further, by mapping different dimensions of the matrix to the systolic array structure, flexibility of the matrix sizes can be calculated. Based on this calculation, a choice can be made as to which matrix dimensions correspond to multiples of the systolic array dimensions and which dimension does not correspond to the multiples of the systolic array dimensions.

It is noted that a scratchpad memory can be limited. The scratchpad memory can be utilized to store and provide input data to the first processing elements in the one or more rows and/or the one or more columns. In an example, a first scratchpad can be located to the north of the array and a second scratchpad can be located to the west of the array. According to an implementation, the second scratchpad can retain activation bits for a second matrix and the first scratchpad can retain initial data bits (or partial data bits in the case of tiling) for a third data matrix. According to another implementation, the first scratchpad can retain activation bits for a second matrix and the second scratchpad can retain initial data bits (or partial data bits in the case of tiling) for a third data matrix.

In an example, if a systolic array uses 16 gigabits per second and external memory bandwidth to the scratchpads that feed the systolic array are 2 gigabits per second, then a wait of seven seconds per every one second of computation can be encountered. If the matrix is bigger than the processing element array, the array can be tiled for data reuse. With enough reuse, bandwidth limitations can be overcome. For example, if the systolic array is an 8 by 8 array, then when calculating an output matrix of size 64 by 64, there can be 8 sets of columns, which can be reused 8 times for 8 sets of rows, and vice versa. For a 16 gigabit per second to systolic array, this reuse indicates the scratchpads only needs two gigabits per second from the external memory.

Figure 3:
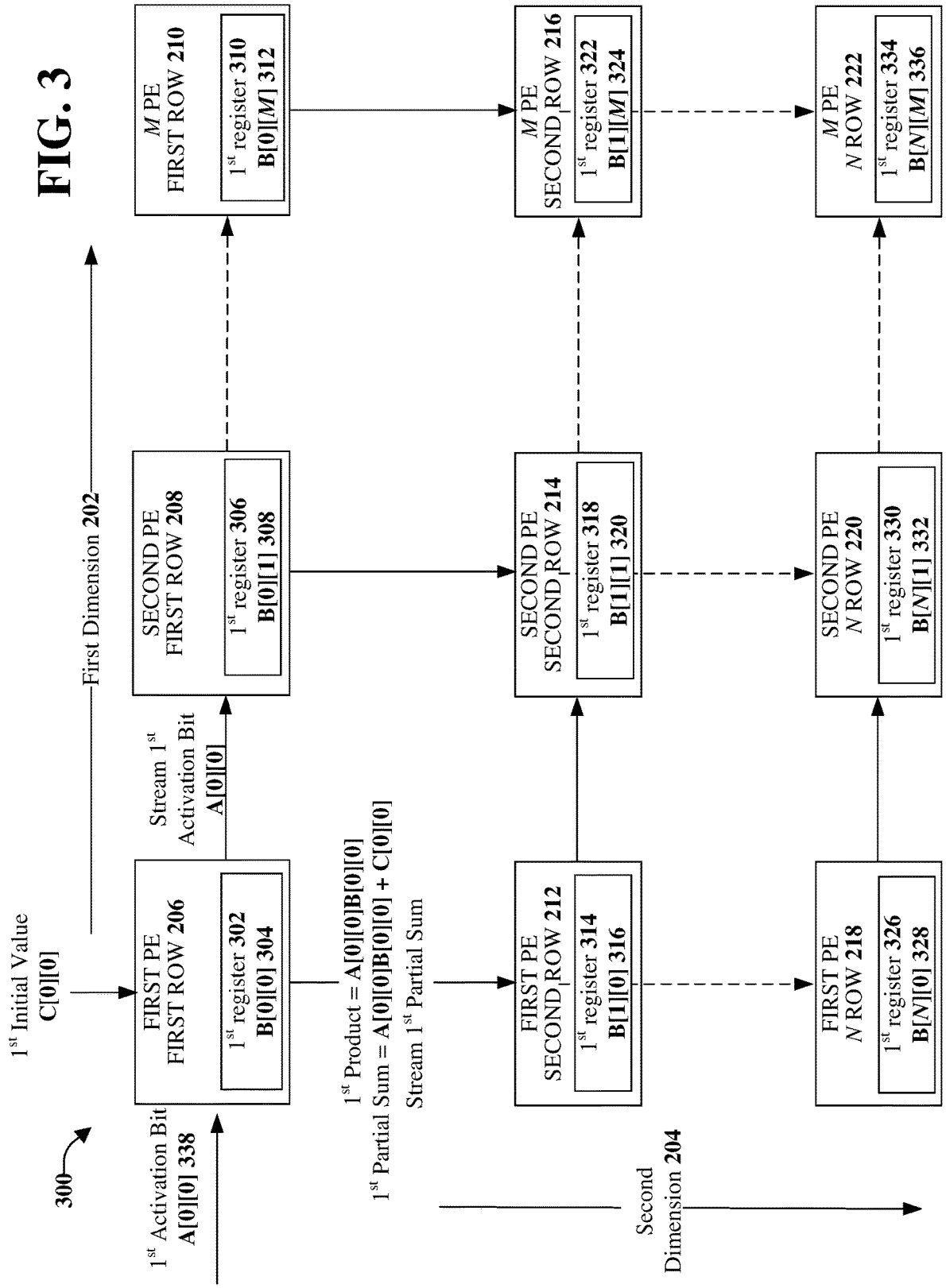
FIG. 3 illustrates a schematic representation of an example, non-limiting architecture of a rectangular systolic array during initiation and a first time period in accordance with one or more embodiments described herein.

With continuing reference to FIG. 1, the load manager component 104 can populate one or more processing elements of the systolic array with respective input data bits of the first input matrix. In an example, the load manager component 104 can populate respective first registers of the one or more processing elements of the systolic array structure with the input data bits of the first matrix (e.g., Matrix B per this implementation). For example, FIG. 3 illustrates a schematic representation of an example, non-limiting architecture of a rectangular systolic array 300 during initiation and a first time period (e.g., Time 0) in accordance with one or more embodiments described herein. Repetitive description of like elements employed in other embodiments described herein is omitted for sake of brevity. The load manager component 104 can populate the first register 302 of the first processing element 206 of row 0, with input data bit B[0][0] 304 of the first matrix. Further, the load manager component 104 can populate a first register 306 of the second processing element 208 of row 0 with input data bit B[0][1] 308, and a first register 310 of the M processing element 210 of row 0 can be populated with input data bit B[0][M] 312. In a similar manner, the load manager component 104 can populate a first register 314 of the first processing element 212 of Row 1 with input data bit B[1][0] 316, a first register 318 of the second processing element 214 of Row 1 with input data bit B[1][1] 320, and a first register 322 of the M processing element 216 of Row 1 with input data bit B[1][M] 324. Further, the load manager component 104 can populate a first register 326 of the first processing element 218 of Row N with input data bit B[N][0] 328, a first register 330 of the second processing element 220 of Row N with input data bit B[N][1] 332, and a first register 334 of the M processing element 222 of Row N with input data bit B[N][M] 336.

It is noted that although FIG. 3 illustrates input data bits of the first data matrix being populated in the registers of the one or more processing elements (PEs), the disclosed aspects are not limited to this implementation. Instead, depending on the size of the systolic array, there can be more processing elements than there are input data bits. In another example, there can be more input data bits than there are processing elements and, therefore, tiling can be utilized as described herein.

During a first time period (e.g., Time 0), the load manager component 104 can also facilitate input of a first activation bit A[0][0] 338 of a second data matrix (e.g., Matrix A in this implementation) into a first processing element (e.g., first processing element 206 of Row 1). It is noted that input of other activation bits into other processing elements can also be performing during the first time period.

The computation component 106 (of FIG. 1) can determine a first partial sum of a third data matrix (e.g., Matrix C) at the first processing element 206 of the first row. The first partial sum can be determined by the computation component 106 based on a first sum that comprises a first product and a first initial value of the third data matrix (e.g., Matrix C). The first product can be determined based on the first activation bit 338 and the first input data bit 304. For example, the first product can be based on the equation A[0][0]B[0][0] and the first initial value can be C[0][0]. This can result in the first partial sum being A[0][0]B[0][0]+C[0][0].

The shift manager component 108 (of FIG. 1) can stream the first partial sum of the third data matrix (e.g., Matrix C) from the first processing element and along the second dimension during a next clock cycle. Therefore, in the implementation of FIG. 3, the shift manager component 108 can stream the first partial sum from the first processing element 206 of Row 0 to the first processing element 212 of Row 1. In addition, the shift manager component 108 can stream the first activation bit A[0][0] from the first processing element 206 of Row 0 to the second processing element 208 of Row 0.

Figure 4:
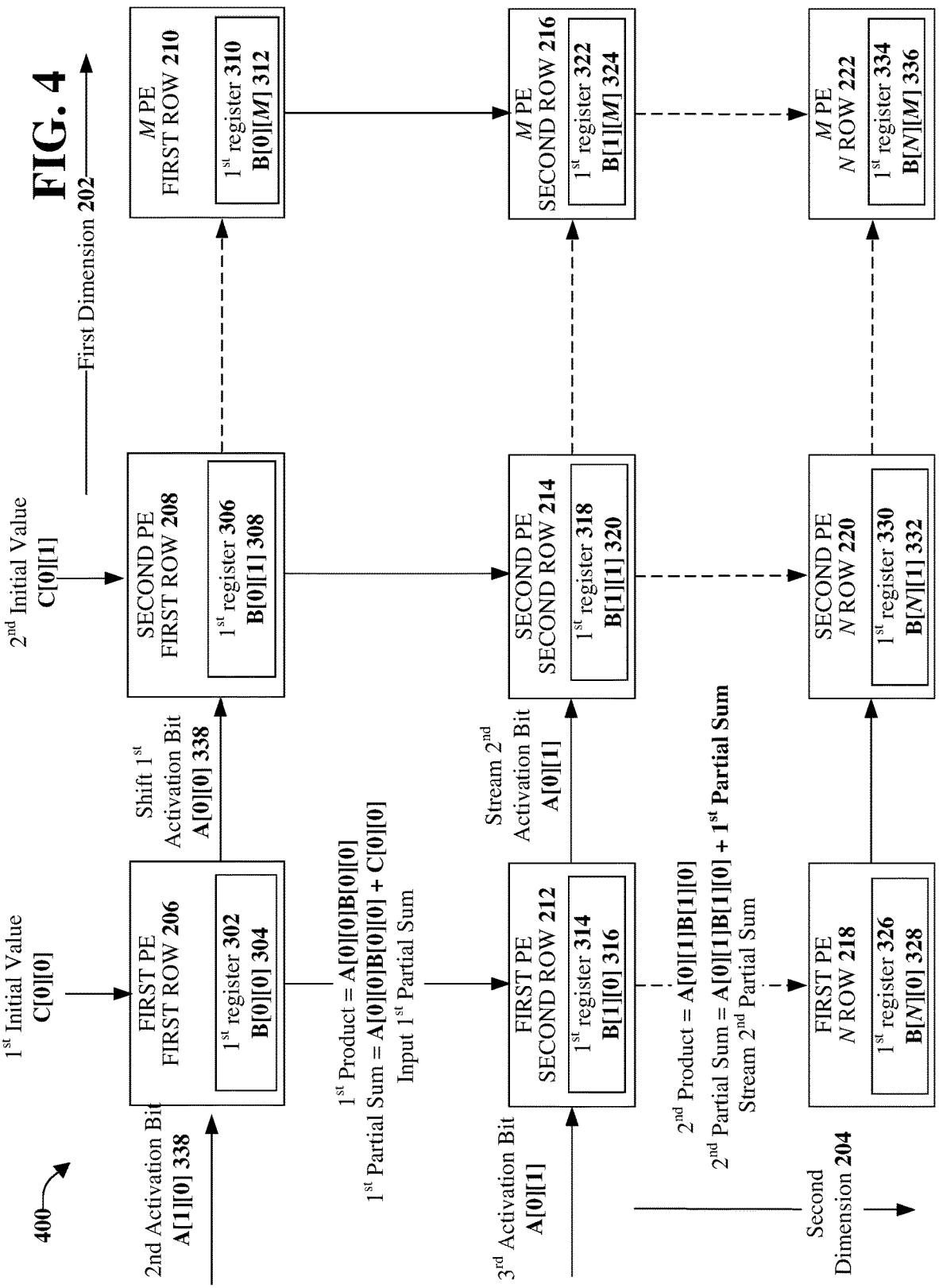
FIG. 4 illustrates a schematic representation of an example, non-limiting architecture of a rectangular systolic array during a second time period in accordance with one or more embodiments described herein.

FIG. 4 illustrates a schematic representation of an example, non-limiting architecture of a rectangular systolic array 400 during a second time period (e.g., Time 1) in accordance with one or more embodiments described herein. Repetitive description of like elements employed in other embodiments described herein is omitted for sake of brevity.

During the second time period (e.g., Time 1), the load manager component 104 can load a second activation bit A[1][0] of Matrix A into the first processing element 206 of Row 0, and a third activation bit A[0][1] of Matrix A into the first processing element 212 of Row 1.

To stream the first partial sum of the third data matrix along the second dimension 204 of the one or more processing elements of the systolic array structure can include the shift manager component 108 facilitating input of the first partial sum to a second processing element of one or more processing elements of the systolic array structure. The second processing element, in this implementation, can be the first processing element 212 of Row 1. A second input data bit of the input bits of the first data matrix (e.g., Matrix B) can be stored in the first register 306 of the second processing element 208 of Row 0.

The computation component 106 can determine a second partial sum of the third data matrix (e.g., Matrix C). The second partial sum can be determined by the computation component 106 based on a second sum of a second product (e.g., A[0][1]B[1][0]) and the first partial sum (e.g., A[0][0]B[0][0]). The second product can be determined based on a second activation bit (e.g., A[0][[1]) of the second data matrix and the second input data bit (e.g., B[1][0]). thus, in this implementation, the second partial sum is A[0][1]B[1][0]+A[0][0]B[0][0]+C[0][0].

The shift manager component 108 can stream the second activation bit from the second processing element and along the first dimension 202. Further, the shift manager component can stream the second partial sum of the third data matrix from the second processing element and along the second dimension 204.

Figure 5:
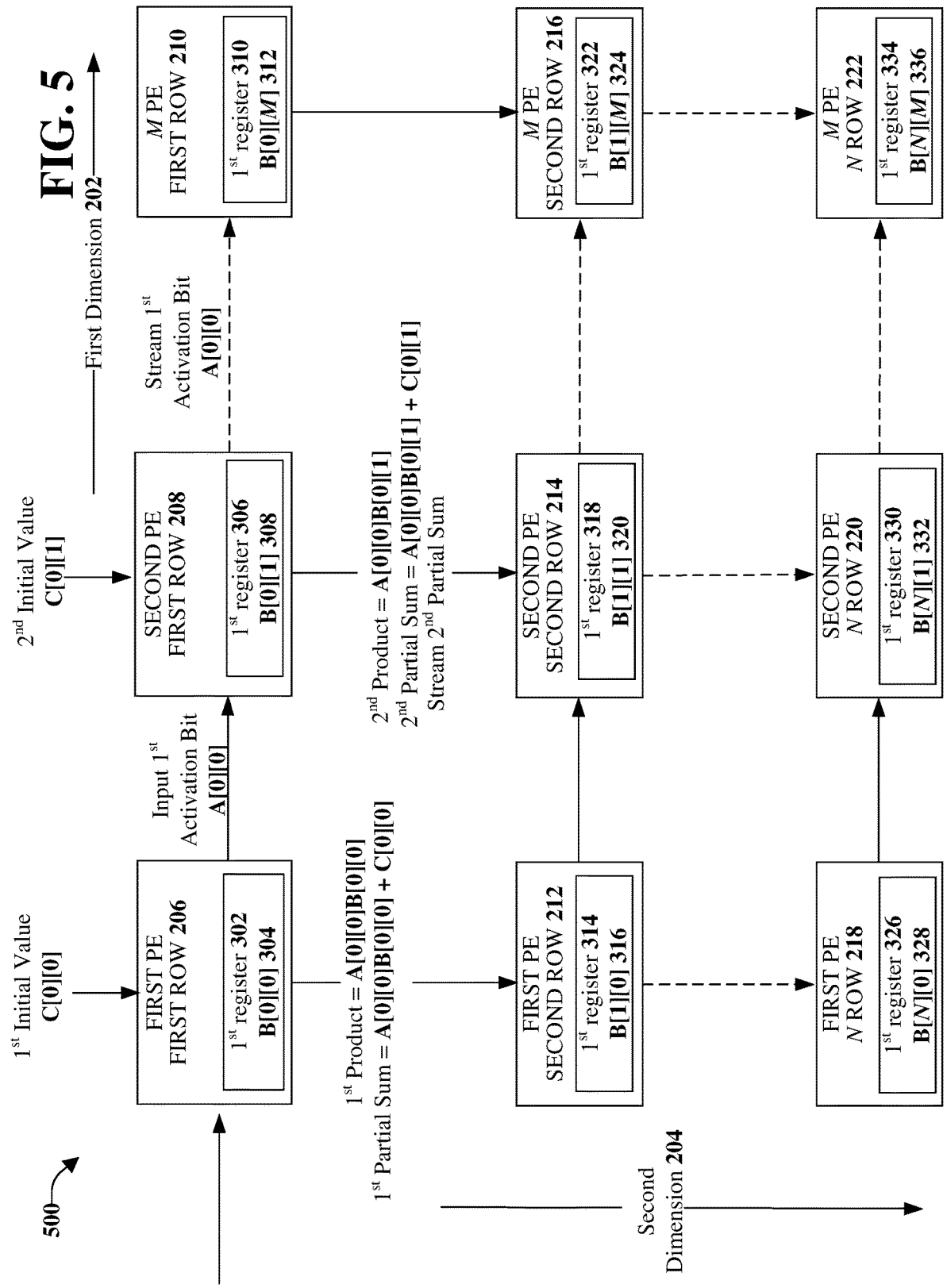
FIG. 5 illustrates a schematic representation of an example, non-limiting architecture of a systolic array with data flow in accordance with one or more embodiments described herein.

FIG. 5 illustrates a schematic representation of an example, non-limiting architecture of a systolic array 500 with data flow in accordance with one or more embodiments described herein. Repetitive description of like elements employed in other embodiments described herein is omitted for sake of brevity.

Streaming the first activation bit along the first dimension 202 can include moving the first activation bit from the first processing element 206 of Row 0 and inputting the first activation bit into the second processing element 208 of Row 0. As illustrated the second processing element 208 comprises a second input data bit of the first data matrix (e.g., B[0][1]). At the second processing element 208, a second product of the first activation bit A[0][0] and the second input data bit B[[0][1] can be determined (e.g., A[0][0]×B[0][1]). Further, at the second processing element 208, a second partial sum of the third data matrix (e.g., Matrix C) can be determined. The second partial sum can be determined based on the second product and a second initial value of the third data matrix (e.g., A[0][0]B[0][1]+C[ ][1]). The first activation bit can be streamed from the second processing element and along the first dimension 202. In addition, the second partial sum of the third data matrix can be streamed from the second processing element and along the second dimension 204.

Figure 6:
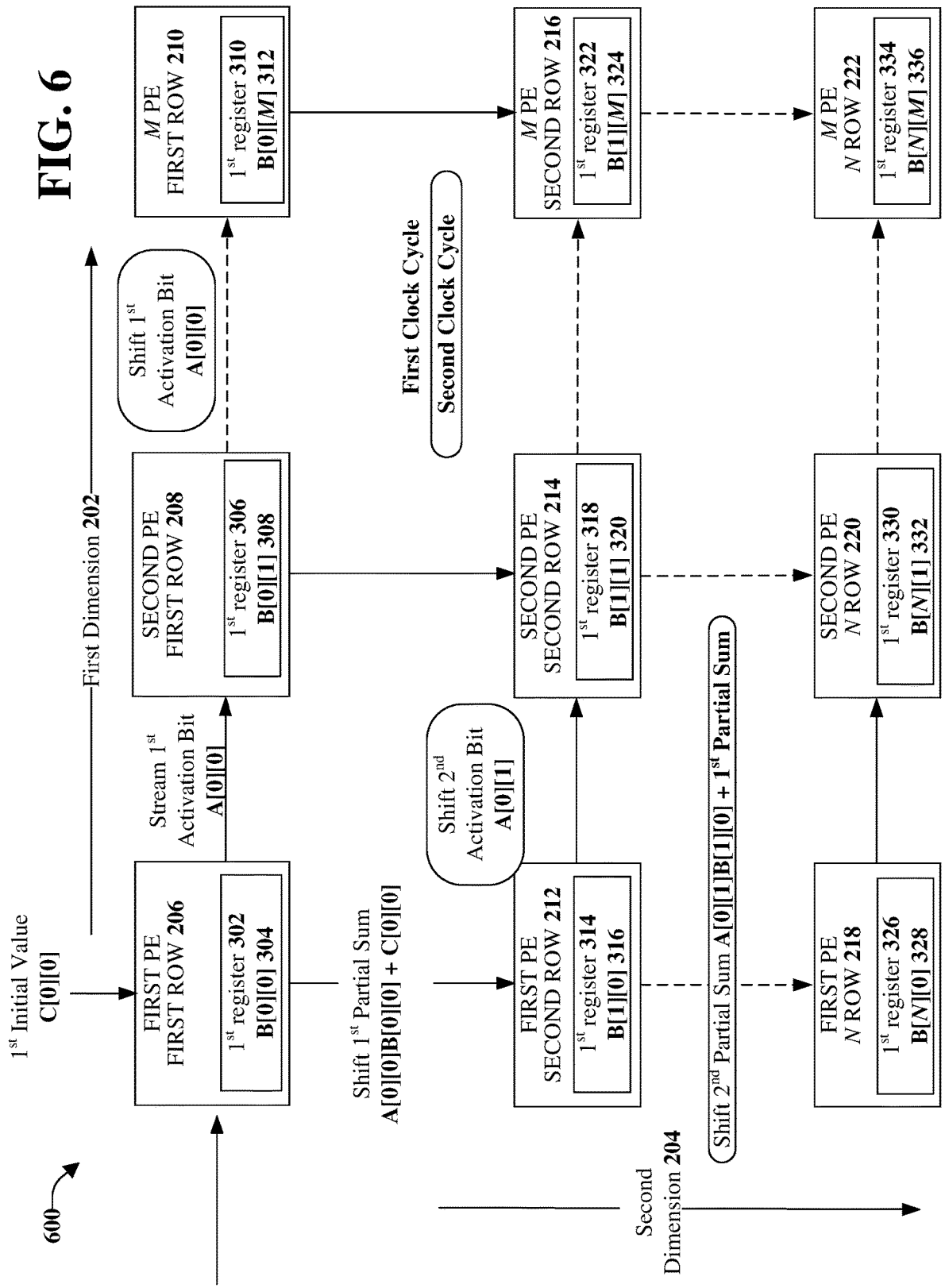
FIG. 6 illustrates a schematic representation of an example, non-limiting architecture of shifting data bits in a rectangular systolic array in accordance with one or more embodiments described herein.

FIG. 6 illustrates a schematic representation of an example, non-limiting architecture of shifting data bits in a rectangular systolic array 600 in accordance with one or more embodiments described herein. Repetitive description of like elements employed in other embodiments described herein is omitted for sake of brevity.

During a first clock cycle, the shift manager component 108 (of FIG. 1) can shift the first activation bit 338 from the first processing element 206 to the second processing element 208 of Row 0 (e.g., along the first dimension 202). The shift manager component 108 can also shift the first partial sum from the first processing element 206 of Row 0 to the first processing 212 element of Row 1 (e.g., along the second dimension 204) during the first clock cycle.

During a second clock cycle, the shift manager component 108 can shift the first activation bit 338 from the second processing element 208 to a subsequent processing element of Row 0 (e.g., along the first dimension 202). Also, during the second clock cycle, the shift manager component 108 can shift the second activation bit from the first processing element 212 of Row 1 to the second processing element 214 of Row 1 (e.g., along the first dimension 202). Further, the shift manager component 108 can shift the second partial sum from the first processing element 212 of Row/to a first processing element of a subsequent row (e.g., along the second dimension 204).

Figure 7:
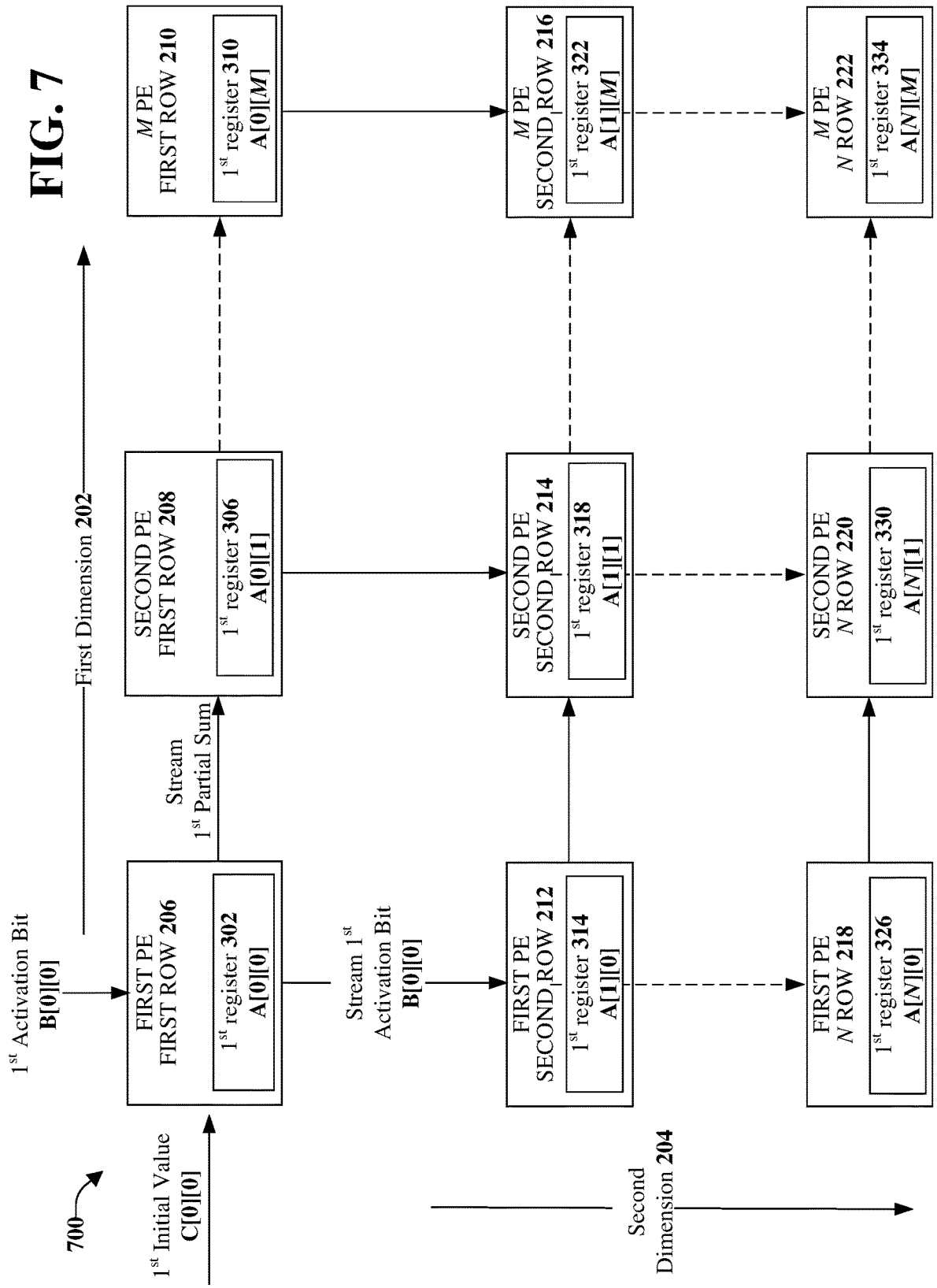
FIG. 7 illustrates a schematic representation of an alternative embodiment of an example, non-limiting architecture of a systolic array in accordance with one or more embodiments described herein.

FIG. 7 illustrates a schematic representation of an alternative embodiment of an example, non-limiting architecture of a systolic array 700 in accordance with one or more embodiments described herein. Repetitive description of like elements employed in other embodiments described herein is omitted for sake of brevity.

Instead of placing Matrix B in the registers, in this embodiment, Matrix A are placed in the registers of the processing elements in the systolic array structure. Thus, the registers of the processing elements can be initially populated with Matrix A. When the data elements of Matrix B are placed in the registers, control of the number of rows of Matrix A can be provided. Alternatively, when the data elements of Matrix A are placed in the registers, control over the number of columns of B can be provided.

The computer processing systems, computer-implemented methods, apparatus and/or computer program products employ hardware and/or software to solve problems that are highly technical in nature (e.g., solving simultaneous linear equations and, specifically, a large-scale linear system of equations for scientific computing) that are not abstract and that cannot be performed as a set of mental acts by a human. For example, a human, or even thousands of humans, cannot efficiently, accurately and effectively manually perform the lengthy sequences of arithmetic computations, which is time consuming and might never be successfully performed. Thus, the one or more embodiments of the subject computer processing systems, methods, apparatuses and/or computer program products can enable the automated processing through use of a systolic array. Further, the one or more aspects can relate to implementation of a systolic array through the use of parallel computers and/or special-purpose machines designed specifically to implement one or more systolic arrays. In addition, the various aspect can reduce overhead and/or increase a processing efficiency of the systolic array structure.

The various aspects provided herein can flow the output (e.g., Matrix C) instead of an input matrix (e.g., Matrix A, Matrix B). Accordingly, the various aspects can match the external memory to scratchpad bandwidth limitations to continuously execute by reusing data. A single blocking load/stored can be performed with loading the input matrix into the registers. Otherwise, the processing elements are fully utilized, which results in improved efficiency. Further, by mapping different dimensions of the matrix to the systolic array structure, more flexibility as the matrix sizes being calculated can be provided. The matrix dimensions corresponding to multiples of the systolic array dimensions and which dimension does not. For example, if Matrix B values are placed in the registers, there can be more control over the number of rows of Matrix A. Alternatively, if Matrix A values are placed in the registers, there is more control over the number of columns of Matrix B.

Figure 8:
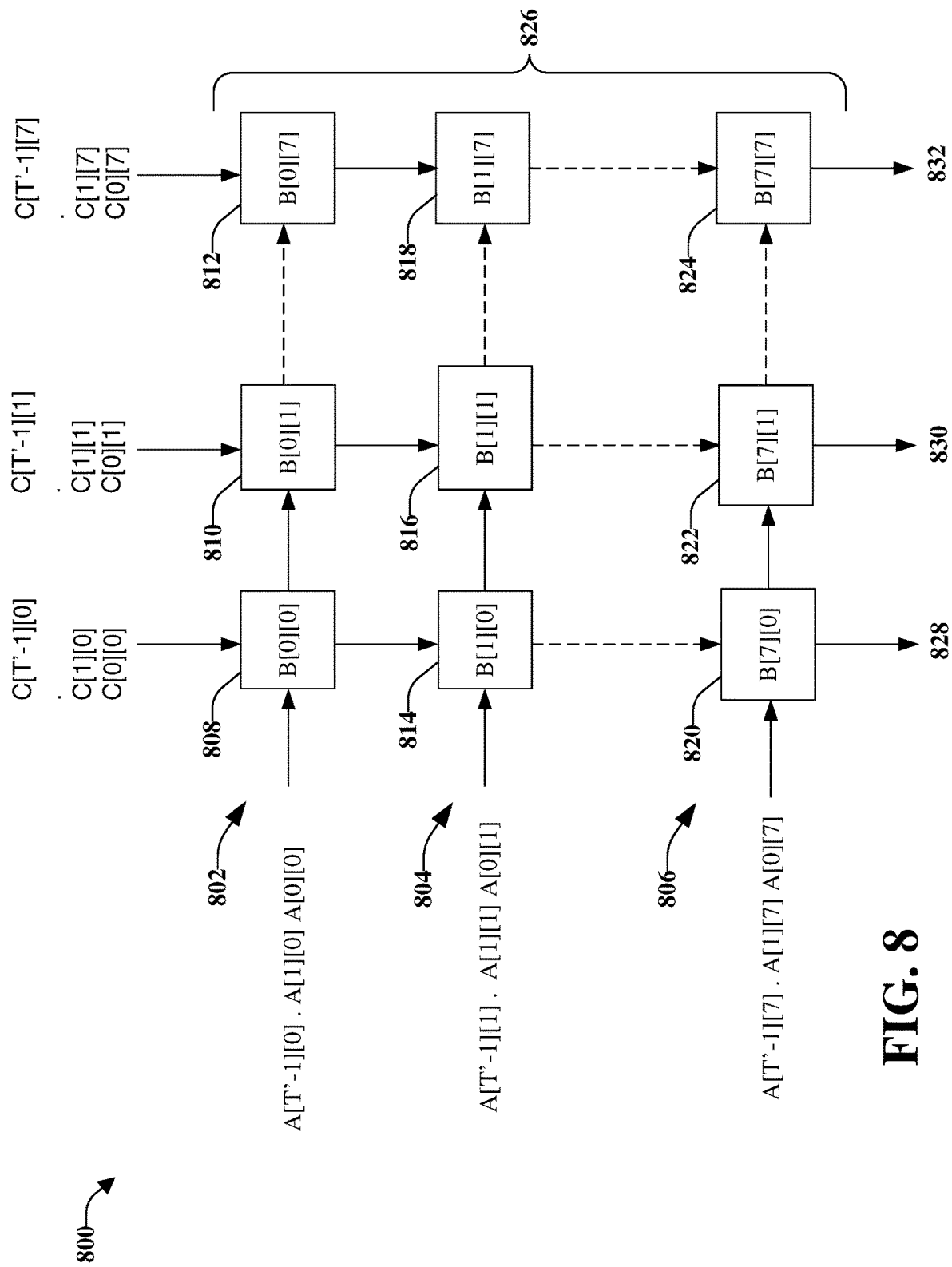
FIG. 8 illustrates an example, non-limiting representation of matrix multiplication with tiling on a systolic array in accordance with one or more embodiments described herein.

FIG. 8 illustrates an example, non-limiting representation of matrix multiplication with tiling on a systolic array 800 in accordance with one or more embodiments described herein. As illustrated Matrix A and Matrix C can be streamed while propagating Matrix A and the partial sum of C, where C=AB. In an alterative implementation, Matrix B can be streamed and propagated instead of Matrix A.

In the implementation of FIG. 8, the processing elements comprise respective first registers. The systolic array 800 comprises one or more processing elements. For example, the systolic arrays comprises a first row 802, a second row 804, through a seventh row 806. The first row 802 can comprise a first processing element 808, a second processing element 810, through a seventh processing element 812. The second row 804 can comprise a first processing element 814, a second processing element 816, through a seventh processing element 818. Further, the seventh row 806 can comprise a first processing element 820, a second processing element 822, through a seventh processing element 824. The inner dimension of A and B is illustrated at 830. Although the systolic array 800 is illustrated and described with respect to seven rows and seven columns, any number of rows and/or columns can be utilized with the disclosed aspects.

As illustrated one or more input data bits of Matrix B can be populated within the registers of the processing elements. For example, the load manager component 104 can populate the first processing element 808 of the first row 802 with input data bit B[0][0], the second processing element 810 of the first row 802 with input data bit B[0][1], and the seventh processing element 812 of the first row 802 with input data bit B[0][7]. In a similar manner, the load manager component 104 can populate the first processing element 814 of the second row 804 with input data bit B[1][0], the second processing element 816 of the second row 804 with input data bit B[1][1], and the seventh processing element 818 of the second row 804 with input data bit B[1][7]. Further, the load manager component 104 can populate the first processing element 820 of the seventh row 806 with input data bit B[7][0], the second processing element 822 of the seventh row 806 with input data bit B[7][1], and the seventh processing element 824 of the seventh row 806 with input data bit B[7][7].

As the calculations of partial values of Matrix C are determined, the partial values are populated though the systolic array 800. As illustrated, after the partial values of Matrix C are determined at the seventh row 806, the partial values are flowed back to memory (e.g., a scratchpad north of the systolic array), as illustrated by arrows 828, 830, and 832 (e.g., tiled).

Figure 9:
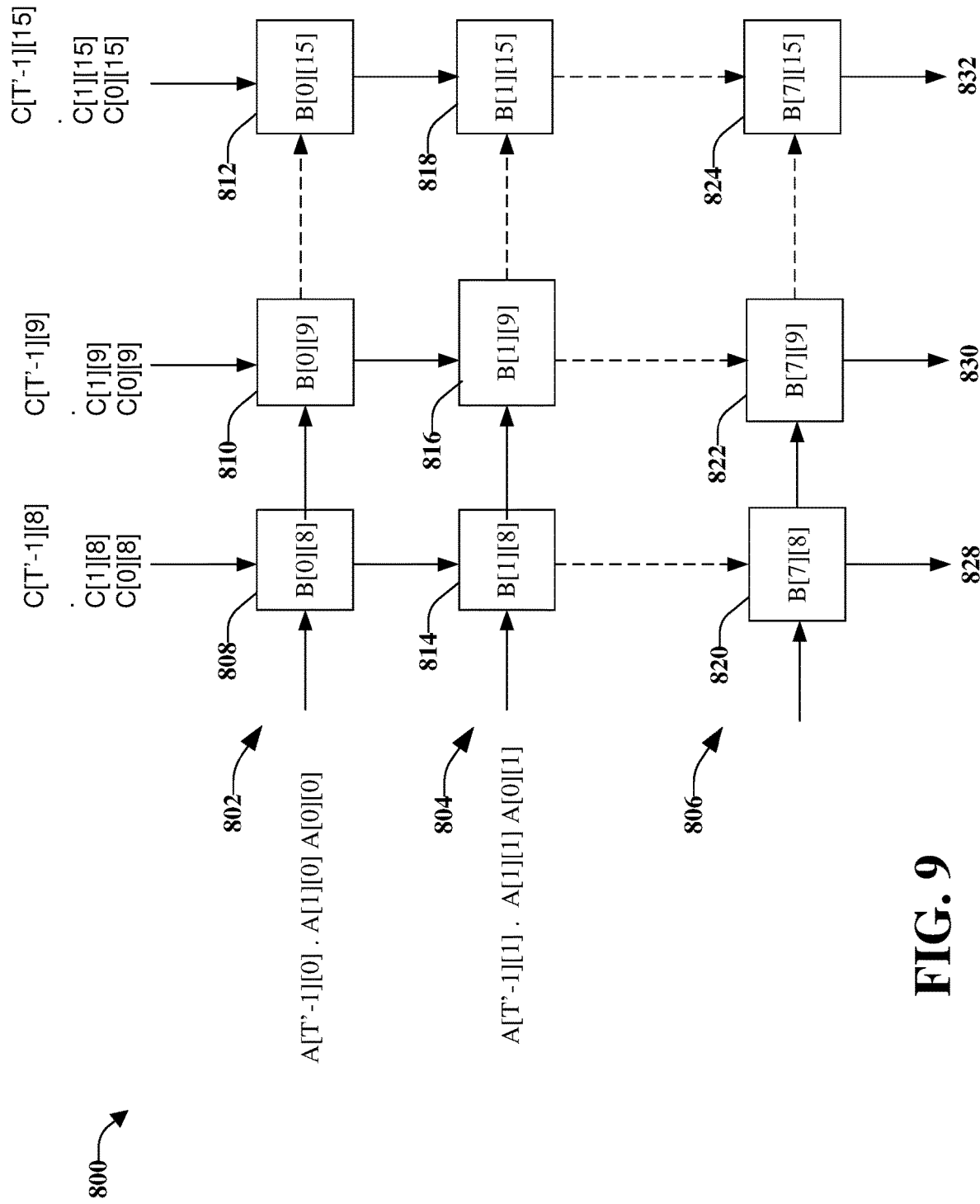
FIG. 9 illustrates the systolic array of FIG. 8 at a first time step in accordance with one or more embodiments described herein.

FIG. 9 illustrates the systolic array 800 of FIG. 8 at a first time step in accordance with one or more embodiments described herein. Upon or after the partial values of C are flowed back to memory, the load manager component 104 can populate the processing elements with new columns of Matrix B in order to reuse Matrix A. In this case, the system is already reusing columns of Matrix B for the rows of Matrix A in memory.

In an example, the load manager component 104 can load, in the first row 802, input values B[0][8], B[0][9], and so on (e.g., . . . B[0][9] B[0][8]). The load manager component 104 can load, in the second row 804, input values B[1][8], B[1][9], and so on (e.g., . . . B[1][9] B[1][8]). Further, the load manager component 104 can load, in the seventh row 806, input values B[7][8], B[7][9], and so on (e.g., . . . B[7][9] B[7][8]).

As illustrated, additional activation bit values of Matrix A can be streamed. Further, the partial values of C can be streamed. In an example, the partial value of C output at 828 can be input to the first processing element 808, the partial value of C output at 830 can be input to the second processing element 810, and the partial value of C output at 832 can be input to the seventh processing element 812. If needed, the partial values can again flow back to memory (e.g., tiled).

Figure 10:
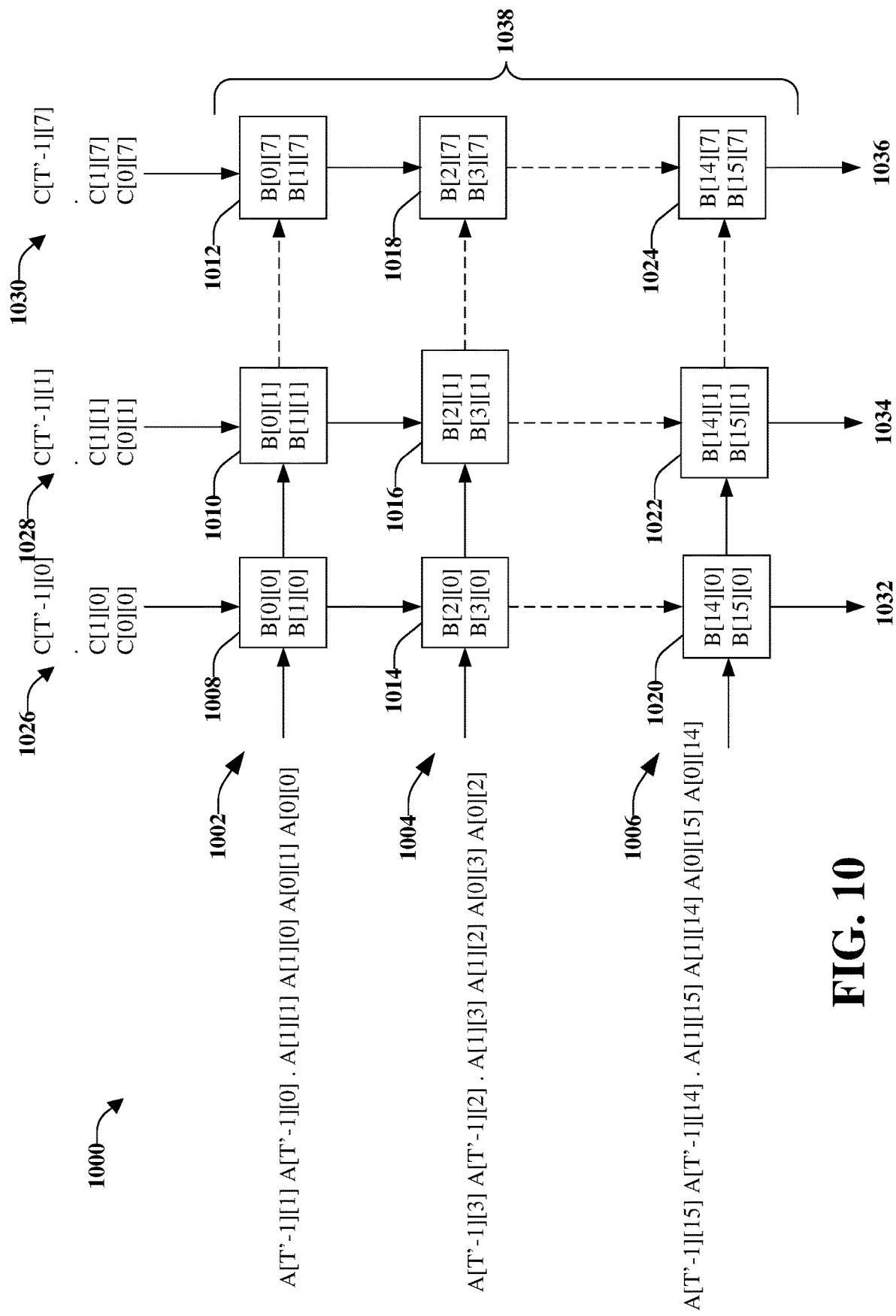
FIG. 10 illustrates an example, non-limiting representation of matrix multiplication when processing elements of a systolic array comprise more than one register in accordance with one or more embodiments described herein.

FIG. 10 illustrates an example, non-limiting representation of matrix multiplication when processing elements of a systolic array 1000 comprise more than one register in accordance with one or more embodiments described herein. According to some implementations, a particular systolic array might not allows concurrent loading of Matrix C to one end and storing Matrix C at the other end. In accordance with these implementations, more than one register can be utilized for the one or more processing elements. For example, one or more processing elements can include two or more registers. The use of more than one register can reduce bandwidth of the systolic array. This can also be another general purpose way to reuse data. For example, the one or more Matrix C values can stay in the one or more processing elements for at least two time steps (or clock cycles). In an example implementation of processing elements comprising three registers, one load of Matrix C values can be performed every two time steps and one store every two time steps.

The systolic array 1000 can comprise one or more processing elements. For example, the systolic arrays can comprise a first row 1002, a second row 1004, through an N row 1006. The first row 1002 can comprise a first processing element 1008, a second processing element 1010, through an M processing element 1012. The second row 1004 can comprise a first processing element 1014, a second processing element 1016, through an M processing element 1018. Further, the N row 1006 can comprise a first processing element 1020, a second processing element 1022, through an M processing element 1024.

As illustrated one or more input data bits of Matrix B can be populated within the one or more registers of the processing element. For example, the first processing element 1008 of the first row 1002 can include input data bit B[0][0] and input data bit B[1][0], the second processing element 1010 of the first row 1002 can include input data bit B[0][1] and input data bit B[1][7]. The other processing elements can be populated with the input data bits of Matrix B in a similar manner.

Matrix A can be streamed through the systolic array 1000 from west to east, while propagating A through the systolic array 1000. For example, data flow A[T'-1][1] A[T'-1][0]. A[1][1] A[1][0] A[0][1] A[0][0] can be streamed through the first row 1002. Data flow A[T'-1][3] A[T'-1][2]. A[1][3] A[1][2] A[0][3] A[0][2] can be streamed through the second row 1004. Further, data flow A[T'-1][15] A[T'-1][14] A[1][15] A[1][14] A[0][15] A[0][14] can be streamed through the third row 1006.

Matrix C can be streamed, while the partial sum of Matrix C can be propagated through the systolic array 1000. In an implementation, the data array can comprise columns, illustrated as a first column 1026, a second column 1028, and a third column 1030. Propagated through the first column 1026 can be data C[T'-1][0]. C[1][0] C[0][0]. Propagated through the second column 1028 can be data C[T'-1][1]. C[1][1] C[0][1]. Further, propagated through the third column 1030 can be data C[T'-1][7]. C[1][7] C[0][7]. The data of Matrix C flows back to memory as indicated at 1032, 1034, and 1036. Further, illustrated is the inner dimension 1038 of A and B.

Figure 11:
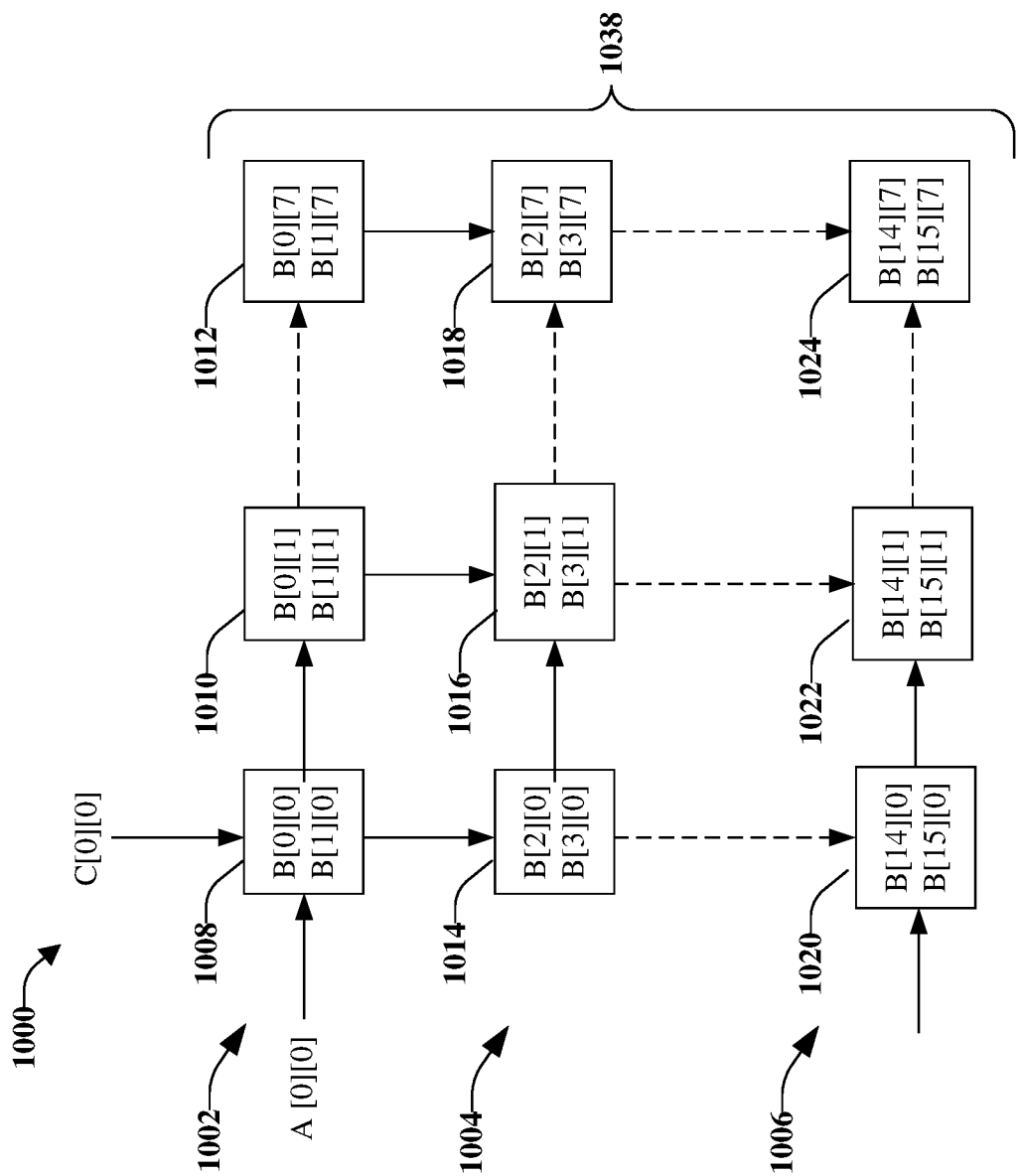
FIG. 11 illustrates the systolic array of FIG. 10 at a first time step in accordance with one or more embodiments described herein.

FIG. 11 illustrates the systolic array 1000 of FIG. 10 at a first time step in accordance with one or more embodiments described herein. As illustrated, at the first time step (e.g., time step 0), the input data bits have already been populated in the processing elements. During the first time step (e.g., time step 0), a first activation bit of a second data matrix and a first initial value of a third data matrix can be input into the first processing element 1008 of the first row 1002. In this example, the second data matrix is Matrix A and the first activation bit is A[0][0]. Further the third data matrix is Matrix C and the first initial value is C[0][0].

Figure 12:
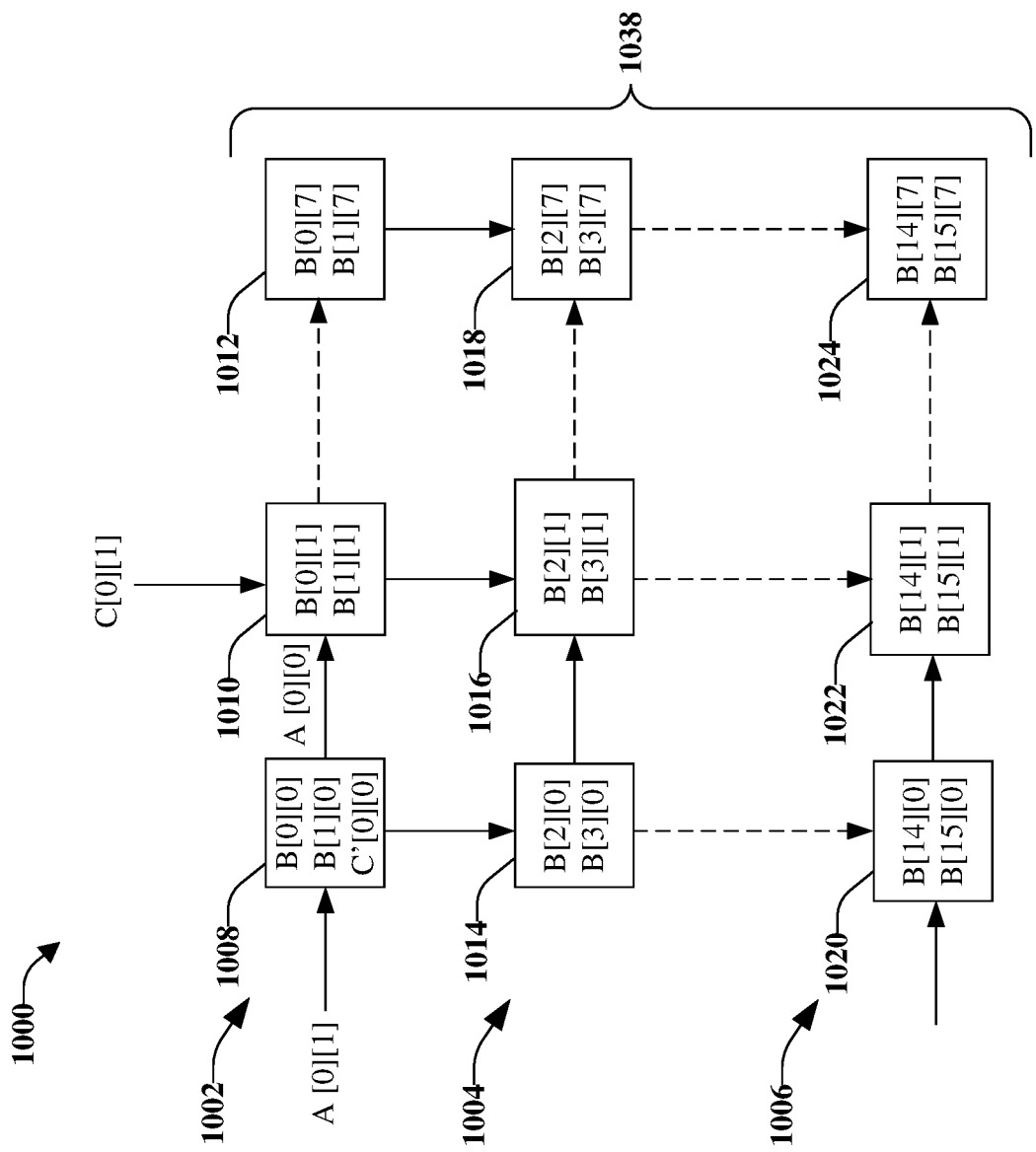
FIG. 12 illustrates the systolic array of FIG. 10 at a second time step in accordance with one or more embodiments described herein.

FIG. 12 illustrates the systolic array 1000 of FIG. 10 at a second time step in accordance with one or more embodiments described herein. During the second time step (e.g., time step 1), A[0][0]B[0][0]+C[0][0] can be temporarily stored in a first register of the first processing element 1008. A new initial value of the third matrix (e.g., Matrix C) is not input into the first processing element 1008 at this time step since there are two registers and two calculations are performed (e.g., a first calculation at time step 0 and a second calculation at time step 1). Retaining the value of Matrix C in the processing element for two time steps, can reduce bandwidth. Accordingly, the first initial value of the third data matrix can be stored in the first processing element for two clock cycles. Further, during time step 1, A[0][0] can be streamed from the first processing element 1008 to the second processing element 1010. A second activation bit A[0][1] can be input into the first processing element 1008 and a second initial value C[0][1] can be input into the second processing element 1010. It is noted that the designation C'[0][0] is denoted in element 1008 to indicate the value inside the processing element 1008 is not the same as the C[0][0] and C[0][1] values being streamed in from the north. Instead, it is the partial sum C[0][0]+A[0][0]B[0][0].

Figure 13:
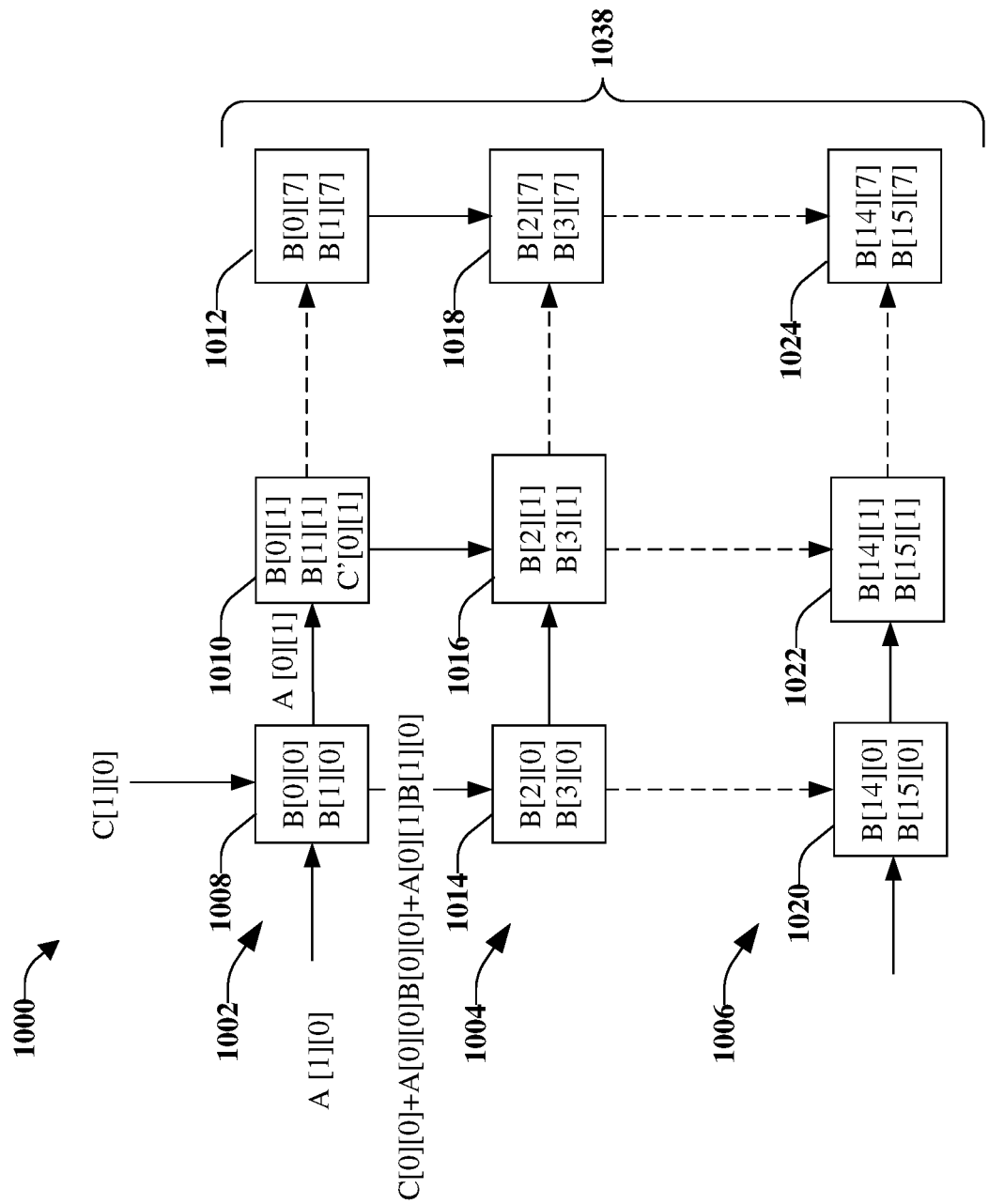
FIG. 13 illustrates the systolic array of FIG. 10 at a third time step in accordance with one or more embodiments described herein.

FIG. 13 illustrates the systolic array 1000 of FIG. 10 at a third time step in accordance with one or more embodiments described herein. During the third time step (e.g., time step 2). The first initial value C[0][0] can be sent out of the first processing element 1008 with two added terms A[0][0]B[0][0]+A[0][1]B[1][0]. The second activation bit A[0][1] can be streamed to the second processing element 1010. During time step 2, the second processing element does not need a new initial value of C, since C can be stored in the second processing element 1010 for this time step (e.g., stored for two time steps). Further, A[1][0] and C[1][0] can be input into the first processing element during time step 2. It is noted that the designation C'[0][1] is denoted in element 1010 to indicate the value inside the processing element 1010 is not the same as the C[0][0] and C[0][1] values being streamed in from the north. Instead, it is the partial sum C[0][1]+A[0][0]B[0][1].

According to some implementations, if more registers are available and if bandwidth from the scratchpad streaming Matrix A should be decreased, there can be more registers to store more columns of Matrix B. In this implementation, the one or more processing elements can use the respective values of Matrix A twice (e.g., for two time steps). Further, single instruction, multiple data (SIMD) can be utilized in this manner of more columns to increase the throughput instead of lowering the bandwidth.

The following is a basic pseudocode that can be utilized according to an implementation.

```
// Tile C by NUM_ROWSxNUM_COLS. Due to scratchpad space limits, the amount of C
that can be calculated at a same time.
// Outer two for loops just move C from left to right and then top to bottom.
    for (m=0; m<M; m+=NUM_ROWS) {
        for (k=0; k<K; k+=NUM_COLS) {
            for (n=0; n<N; n+=MAX_PE*NUM_B_LRFS) {        // For this C tile, go
through inner dimension.
                LX_A <- L3_A        // Load new double buffered A matrix section
from L3 cache.
                for (kc=0; kc<NUM_COLS; kc+=SIMDWIDTH*MAXPE) {        // Go
through columns of C.
                    LX_B <- L3_B    // Load new double buffered B matrix section
from L3 cache.
                    for one or more PEs:
                        for (i=0; i<NUM_ROWS; i++) {        // Go through rows of
C.
                            // LRF0-7 have the B values. NUM_B_LRFS is 8 in this
implementation.
                            LRF9 <- West*LRF0 + North;        // North has C values.
West has A values.
                            LRF9 <- West*LRF1 + LRF9;
                            LRF9 <- West*LRF2 + LRF9;
                            LRF9 <- West*LRF3 + LRF9;
                            LRF9 <- West*LRF4 + LRF9;
                            LRF9 <- West*LRF5 + LRF9;
                            LRF9 <- West*LRF6 + LRF9;
                            South <- West*LRF7 + LRF9;
                        }
                }
            }
        }
    }
```

According to an implementation, if fused multiply add instructions take multiple cycles and are pipelined, then the algorithm could be slightly adjusted if multiple registers are being utilized. Computations for a number of rows equal to the number of pipeline cycles could be interleaved or double-buffered. In an example of an interleaved pipeline of two cycles, in a single processing element with registers holding B[0][0] and B[1][0], first perform C[0][0]+=A[0][0]B[0][0]. Secondly, perform C[1][0]+=A[1][0]B[0][0]. Then perform C[0][0]+=A[0][1]B[1][0], followed by C[1][0] +=A[1][1]B[1][0], and so on. For a double-buffering approach, memory can be divided into to banks. One bank can start from C[1][0]+=A[1][0]B[0][0] and the other bank can start from C[1+x]+=A[1+x][0]B[0][0]. Processing elements can process these two memory bank alternatively.

Figure 14:
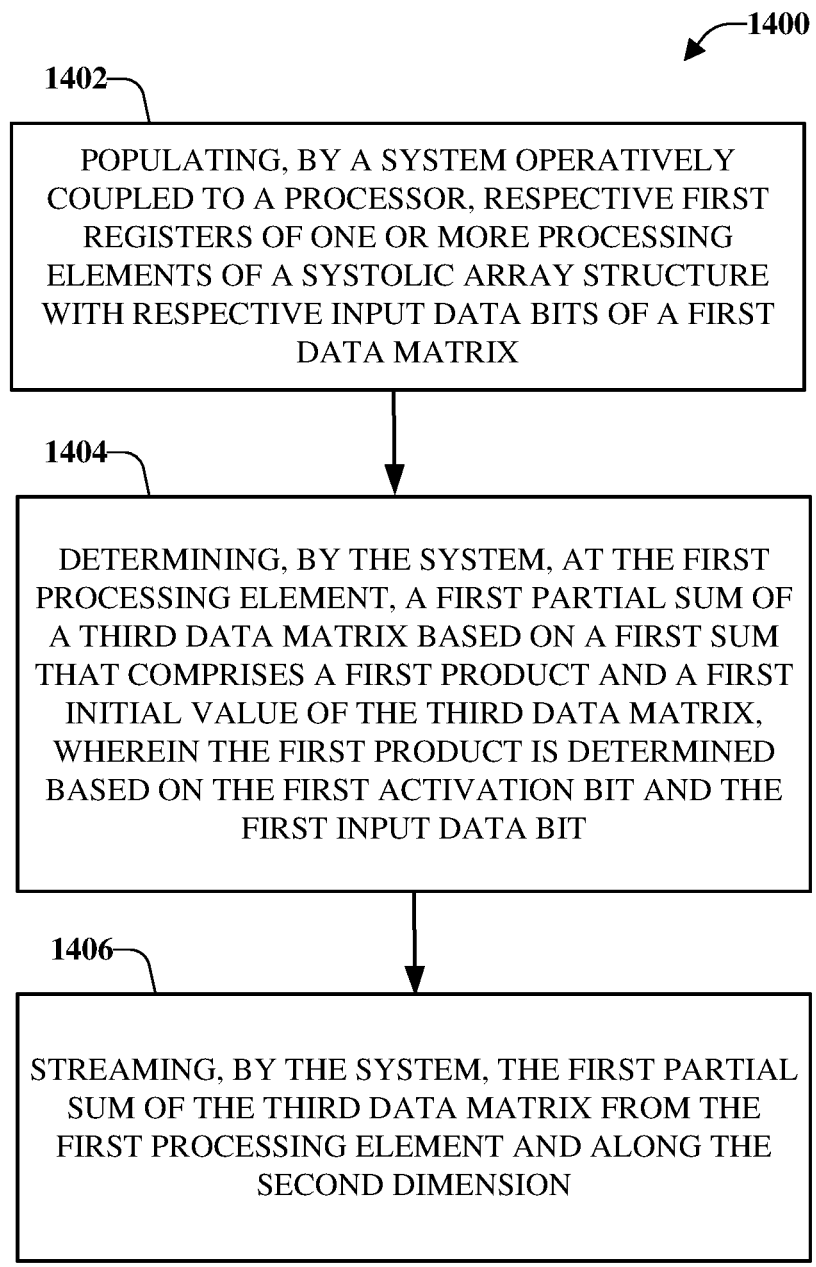
FIG. 14 illustrates a flow diagram of an example, non-limiting computer-implemented method that facilitates flowing an output in a systolic array structure in accordance with one or more embodiments described herein.

FIG. 14 illustrates a flow diagram of an example, non-limiting computer-implemented method 1400 that facilitates flowing an output in a systolic array structure in accordance with one or more embodiments described herein. The various aspects discussed herein flow the output instead of the input, especially when calculating many separate outputs.

The non-limiting computer-implemented method 1400 starts, at 1402, when a system operatively coupled to a processor can populate respective first registers of one or more processing elements of a systolic array structure with respective input data bits of a first data matrix (e.g., via the load manager component 104). The one or more processing elements can comprise a first processing element that can comprise a first input data bit of the input data bits of the first data matrix and a first activation bit of a second data matrix. Further, the systolic array structure can comprise a first dimension and a second dimension of the one or more processing elements.

At 1404, determine at the first processing element, a first partial sum of a third data matrix based on a first sum that comprises a first product and a first initial value of the third data matrix (e.g., via the computation component 106). The first product can be determined based on the first activation bit and the first input data bit. The system can stream the first partial sum of the third data matrix from the first processing element and along the second dimension, at 1406 (e.g., via the shift manager component 108). Streaming the first partial sum of the third data matrix can comprise increasing a processing efficiency of the systolic array structure.

According to some implementations, the non-limiting computer-implemented method 1400 can include retaining, by the system, the first initial value of the third data matrix in the first processing element for two clock cycles. In an implementation, the first dimension can comprise rows of the systolic array structure and the second dimension can comprise columns of the systolic array structure. In an alternative implementation, the first dimension can comprise columns of the systolic array structure and the second dimension can comprise rows of the systolic array structure.

Figure 15:
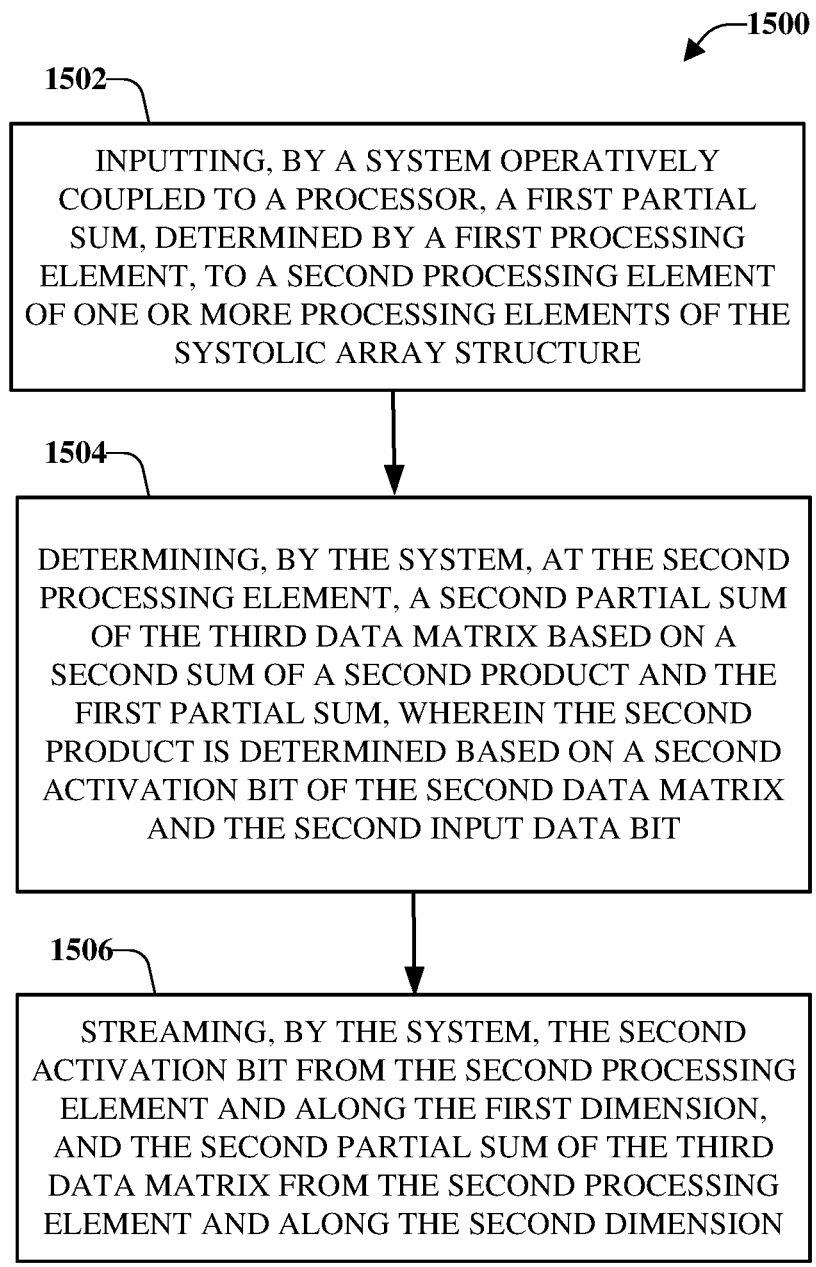
FIG. 15 illustrates a flow diagram of an example, non-limiting computer-implemented method that facilitates streaming partial outputs in a systolic array structure in accordance with one or more embodiments described herein.

FIG. 15 illustrates a flow diagram of an example, non-limiting computer-implemented method 1500 that facilitates streaming partial outputs in a systolic array structure in accordance with one or more embodiments described herein. The non-limiting computer-implemented method 1500 starts, at 1502, when a system operatively coupled to a processor, can input a first partial sum (determined at a first processing element) to a second processing element of one or more processing elements of the systolic array structure (e.g., via the shift manager component 108). A second input data bit of the input data bits of the first data matrix can be stored in a second register of a second processing element.

At 1504, determine, by the system, at the second processing element, a second partial sum of the third data matrix based on a second sum of a second product and the first partial sum (e.g., via the computation component 106). The second product can be determined based on a second activation bit of the second data matrix and the second input data bit. The second activation bit can be streamed by the system, at 1506, from the second processing element and along the first dimension, and the second partial sum of the third data matrix from the second processing element and along the second dimension (e.g., via the shift manager component 108).

Figure 16:
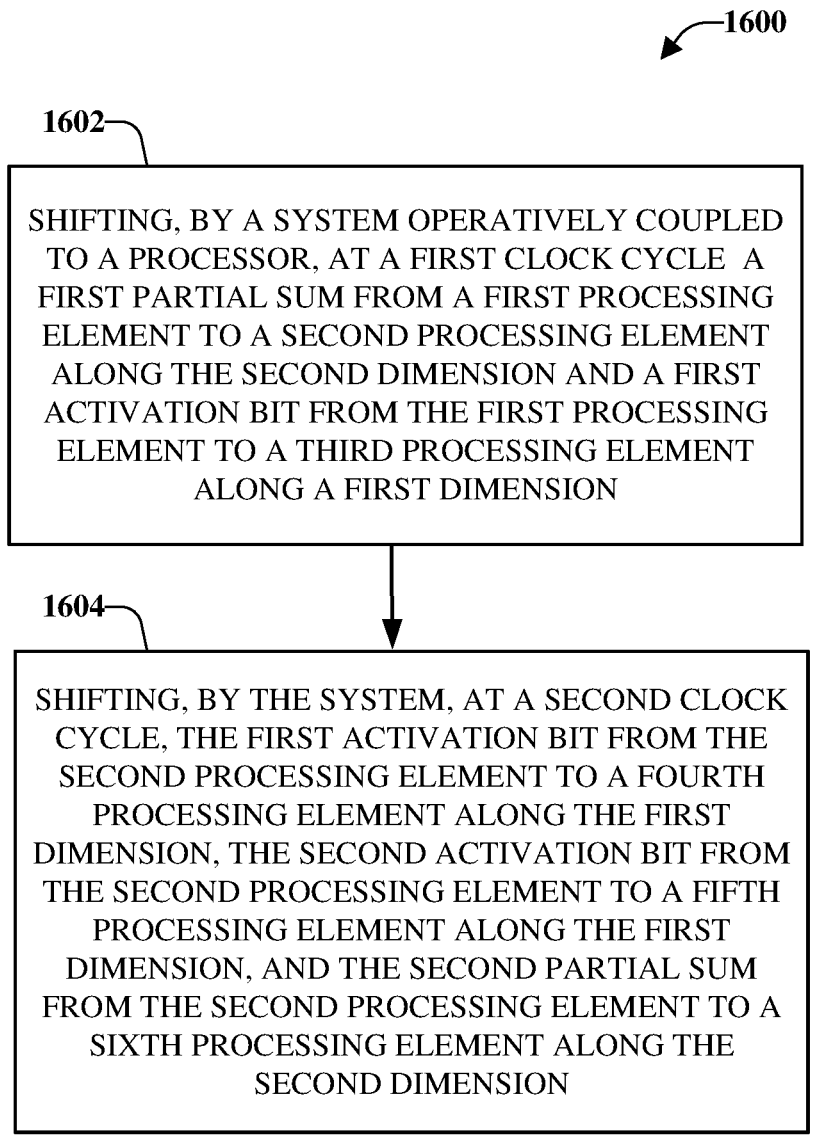
FIG. 16 illustrates a flow diagram of an example, non-limiting computer-implemented method that facilitates shifting data among processing elements of a systolic array structure in accordance with one or more embodiments described herein.

FIG. 16 illustrates a flow diagram of an example, non-limiting computer-implemented method 1600 that facilitates shifting data among processing elements of a systolic array structure in accordance with one or more embodiments described herein. The non-limiting computer-implemented method 1600 starts, at 1602, when a system operatively coupled to a processor, can shift, at a first clock cycle, a first partial sum from a first processing element to a second processing element along a second dimension, and a first activation bit from the first processing element to a third processing element along the first dimension (e.g., via the shift manager component 108).

At 1602 and during a second clock cycle, the system can shift the first activation bit from the second processing element to a fourth processing element along the first dimension, the second activation bit from the second processing element to a fifth processing element along the first dimension, and the second partial sum from the second processing element to a sixth processing element along the second dimension (e.g., via the shift manager component 108).

Figure 17:
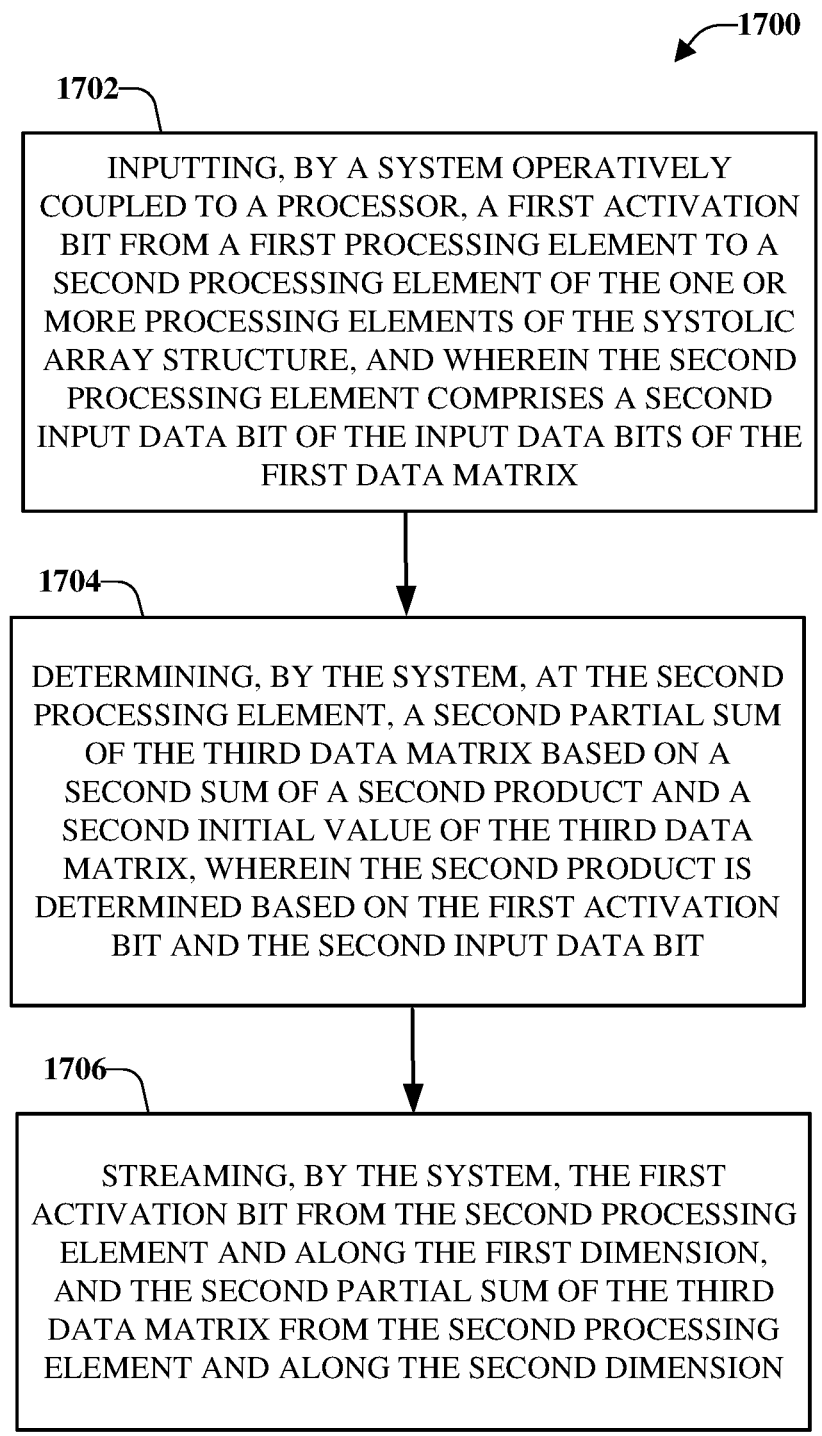
FIG. 17 illustrates a flow diagram of an example, non-limiting computer-implemented method that facilitates streaming partial outputs in a systolic array structure in accordance with one or more embodiments described herein.

FIG. 17 illustrates a flow diagram of an example, non-limiting computer-implemented method 1700 that facilitates streaming partial outputs in a systolic array structure in accordance with one or more embodiments described herein. The non-limiting computer-implemented method 1700 starts, at 1702, when a system operatively coupled to a processor, can input a first activation bit from a first processing element and to a second processing element of the one or more processing elements of the systolic array structure. The second processing element can comprise a second input data bit of the input data bits of a first data matrix.

At 1704, the system can determine, at the second processing element, a second partial sum of the third data matrix based on a second sum of a second product and a second initial value of the third data matrix. The second product can be determined based on the first activation bit and the second input data bit.

The non-limiting computer-implemented method 1700 continues, at 1706, with streaming, by the system, the first activation bit from the second processing element and along the first dimension, and the second partial sum of the third data matrix from the second processing element and along the second dimension.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 18:
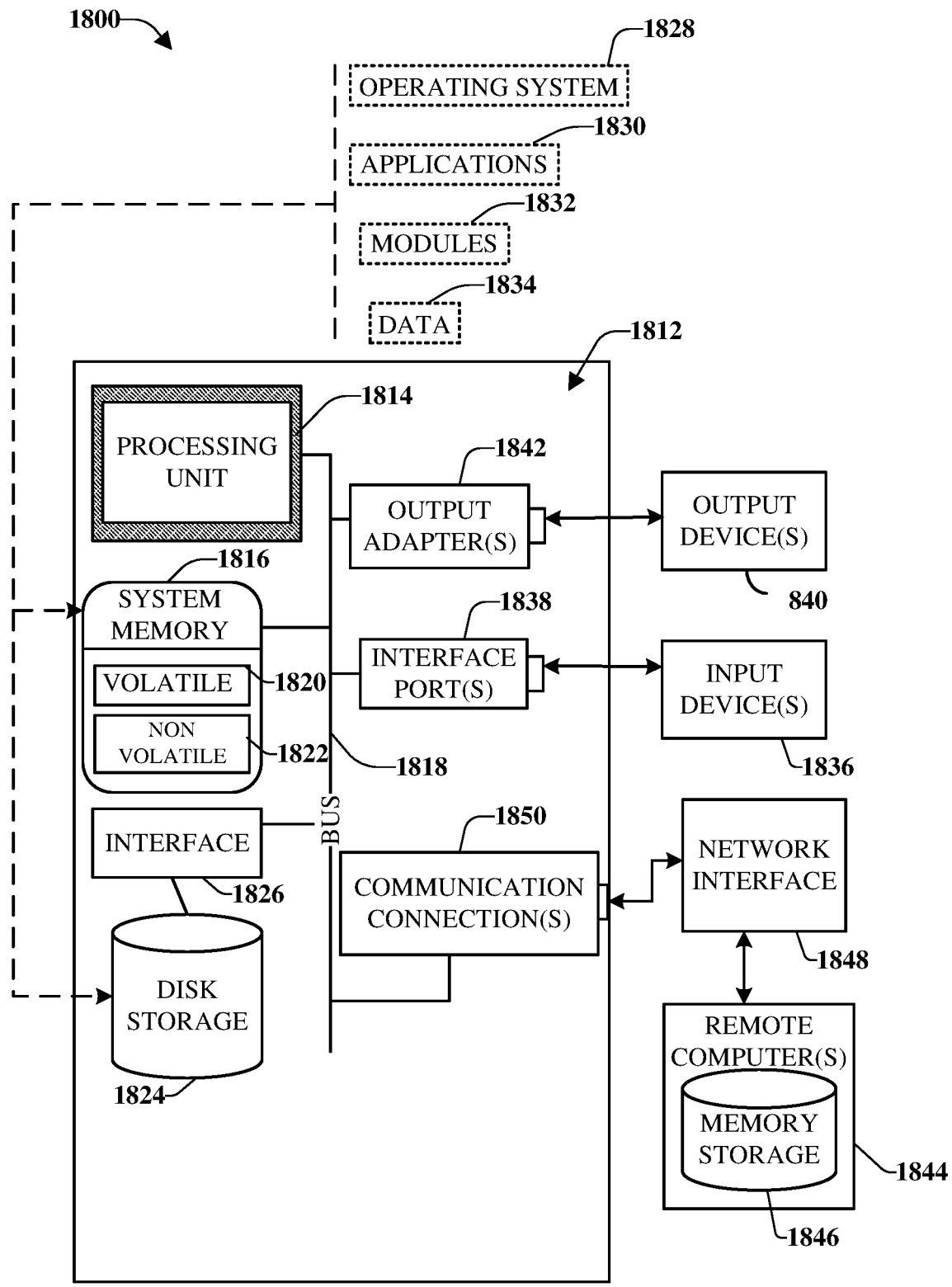
FIG. 18 illustrates a block diagram of an example, non-limiting operating environment in which one or more embodiments described herein can be facilitated.

In order to provide a context for the various aspects of the disclosed subject matter, FIG. 18 as well as the following discussion are intended to provide a general description of a suitable environment in which the various aspects of the disclosed subject matter can be implemented. FIG. 18 illustrates a block diagram of an example, non-limiting operating environment in which one or more embodiments described herein can be facilitated. Repetitive description of like elements employed in other embodiments described herein is omitted for sake of brevity. With reference to FIG. 18, a suitable operating environment 1800 for implementing various aspects of this disclosure can also include a computer 1812. The computer 1812 can also include a processing unit 1814, a system memory 1816, and a system bus 1818. The system bus 1818 couples system components including, but not limited to, the system memory 1816 to the processing unit 1814. The processing unit 1814 can be any of various available processors. Dual microprocessors and other multiprocessor architectures also can be employed as the processing unit 1814. The system bus 1818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1816 can also include volatile memory 1820 and nonvolatile memory 1822. The basic input/output system (BIOS), containing the basic routines to transfer information between elements within the computer 1812, such as during start-up, is stored in nonvolatile memory 1822. By way of illustration, and not limitation, nonvolatile memory 1822 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1820 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1812 can also include removable/non-removable, volatile/nonvolatile computer storage media. FIG. 18 illustrates, for example, a disk storage 1824. Disk storage

1824 can also include, but is not limited to, devices like a magnetic disk drive, floppy disk drive, tape drive, Jaz drive, Zip drive, LS-100 drive, flash memory card, or memory stick. The disk storage 1824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1824 to the system bus 1818, a removable or non-removable interface is typically used, such as interface 1826. FIG. 18 also depicts software that acts as an intermediary between users and the basic computer resources described in the suitable operating environment 1800. Such software can also include, for example, an operating system 1828. Operating system 1828, which can be stored on disk storage 1824, acts to control and allocate resources of the computer 1812. System applications 1830 take advantage of the management of resources by operating system 1828 through program modules 1832 and program data 1834, e.g., stored either in system memory 1816 or on disk storage 1824. It is to be appreciated that this disclosure can be implemented with various operating systems or combinations of operating systems. A user enters commands or information into the computer 1812 through input device(s) 1836. Input devices 1836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1814 through the system bus 1818 via interface port(s) 1838. Interface port(s) 1838 include, for example, a serial port, a parallel port, a game port, and a universal serial bus (USB). Output device(s) 1840 use some of the same type of ports as input device(s) 1836. Thus, for example, a USB port can be used to provide input to computer 1812, and to output information from computer 1812 to an output device 1840. Output adapter 1842 is provided to illustrate that there are some output devices 1840 like monitors, speakers, and printers, among other output devices 1840, which require special adapters. The output adapters 1842 include, by way of illustration and not limitation, video and sound cards that provide a method of connection between the output device 1840 and the system bus 1818. It should be noted that other devices and/or systems of devices provide both input and output capabilities such as remote computer(s) 1844.

Computer 1812 can operate in a networked environment using logical connections to one or more remote computers, such as remote computer(s) 1844. The remote computer(s) 1844 can be a computer, a server, a router, a network PC, a workstation, a microprocessor based appliance, a peer device or other common network node and the like, and typically can also include many or all of the elements described relative to computer 1812. For purposes of brevity, only a memory storage device 1846 is illustrated with remote computer(s) 1844. Remote computer(s) 1844 is logically connected to computer 1812 through a network interface 1848 and then physically connected via communication connection 1850. Network interface 1848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1850 refers to the hardware/software employed to connect the network interface 1848 to the system bus 1818. While communication connection 1850 is shown for illustrative clarity inside computer 1812, it can also be external to computer 1812. The hardware/software for connection to the network interface 1848 can also include, for exemplary purposes only, internal and external technologies such as, modems including regular telephone grade modems, cable modems and DSL modems, ISDN adapters, and Ethernet cards.

The present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

populating, by a system operatively coupled to a processor, respective first registers and respective second registers of all processing elements of a systolic array structure with respective different input data bits of a first data matrix, wherein the processing elements comprise a first processing element that comprises a first input data bit of the input data bits of the first data matrix, a second input data bit of the input data bits of the first data matrix, and a first activation bit of a second data matrix, and wherein the systolic array structure comprises a first dimension and a second dimension of the processing elements, and the respective input data bits of the first data matrix are maintained in the respective first registers and respective second registers while a matrix multiplication of the first data matrix and the second data matrix is completed; and determining, by the system during the matrix multiplication in a first time step, at the first processing element, a first partial sum of a third data matrix based on a first sum that comprises a first product and a first initial value of the third data matrix, wherein the first product is determined based on the first activation bit and the first input data bit.

2. The computer-implemented method of claim 1, further comprising:

shifting, by the system during the matrix multiplication in a second time step, the first activation bit from the first processing element to a third processing element along the first dimension;

shifting, by the system during the matrix multiplication in the second time step, a second activation bit from the second data matrix into the first processing element; and determining, by the system during the matrix multiplication in the second time step, at the first processing element, a second partial sum of the third data matrix based on the first sum and a second product determined based on the second activation bit and the second input data bit.

3. The computer-implemented method of claim 2, further comprising:
shifting, by the system during the matrix multiplication in the second time step, a second initial value of the third data matrix into the third processing element;
determining, by the system during the matrix multiplication in the second time step, at the second processing element, a third partial sum of the third data matrix based on a third sum that comprises a third product and second initial value of the third data matrix, wherein the third product is determined based on the first activation bit and a third input data bit of the input data bits of the first data matrix populated in the third processing element.

4. The computer-implemented method of claim 2, further comprising:
shifting, by the system during the matrix multiplication in a third time step, the second partial sum of the third data matrix from the first processing element to a second processing element along the second dimension:
shifting, by the system during the matrix multiplication in the third time step, a third initial value of the third data matrix into the first processing element;
shifting, by the system during the matrix multiplication in the third time step, a third activation bit from the second data matrix into the first processing element;
shifting, by the system during the matrix multiplication in the third time step, a fourth activation bit from the second data matrix into the second processing element; and
shifting, by the system during the matrix multiplication in a third time step, the second activation bit from the first processing element to the third processing element along the first dimension.

5. The computer-implemented method of claim 4, further comprising:
determining, by the system during the matrix multiplication in the third time step, at the first processing element, a fourth partial sum of the third data matrix based on a fourth sum that comprises a fourth product and the third initial value of the third data matrix, wherein the fourth product is determined based on the third activation bit and the first input data bit.

6. The computer-implemented method of claim 4, further comprising:
determining, by the system during the matrix multiplication in the third time step, at the third processing element, a fifth partial sum of the third data matrix based on a fifth sum that comprises a fifth product and the third partial sum of the third data matrix, wherein the fifth product is determined based on the second activation bit and the fourth input data bit of the input data bits of the first data matrix populated in the third processing element.

7. The computer-implemented method of claim 4, further comprising:
determining, by the system during the matrix multiplication in the third time step, at the second processing element, a sixth partial sum of the third data matrix based on a sixth sum that comprises a sixth product and the second partial sum of the third data matrix, wherein the sixth product is determined based on the fourth activation bit and a fifth input data bit of the input data bits of the first data matrix populated in the second processing element.

8. A system, comprising:
a memory that stores computer executable components; and
a processor that executes the computer executable components stored in the memory, wherein the computer executable components comprise:
a load manager component that populates respective first registers and respective second registers of all processing elements of a systolic array structure with respective different input data bits of a first data matrix, wherein the processing elements comprise a first processing element that comprises a first input data bit of the input data bits of the first data matrix, a second input data bit of the input data bits of the first data matrix, and a first activation bit of a second data matrix, and wherein the systolic array structure comprises a first dimension and a second dimension of the processing elements, and the respective input data bits of the first data matrix are maintained in the respective first registers and respective second registers while a matrix multiplication of the first data matrix and the second data matrix is completed;
a computation component that determines, during the matrix multiplication in a first time step, at the first processing element, a first partial sum of a third data matrix based on a first sum that comprises a first product and a first initial value of the third data matrix, wherein the first product is determined based on the first activation bit and the first input data bi;
a shift manager component that streams, during the matrix multiplication, the first partial sum of the third data matrix along a first dimension to a second processing element of the processing elements.

9. The system of claim 8, further comprising:
a shift manager component that:
shifts, during the matrix multiplication in a second time step, the first activation bit from the first processing element to a third processing element along the first dimension,
shifts, during the matrix multiplication in the second time step, a second activation bit from the second data matrix into the first processing element; and
wherein the computation component determines, during the matrix multiplication in the second time step, at the first processing element, a second partial sum of the third data matrix based on the first sum and a second product determined based on the second activation bit and the second input data bit.

10. The system of claim 9,
wherein the shift manager component shifts, during the matrix multiplication in the second time step, a second initial value of the third data matrix into the third processing element; and
wherein the computation component determines, during the matrix multiplication in the second time step, at the second processing element, a third partial sum of the third data matrix based on a third sum that comprises a third product and second initial value of the third data matrix, wherein the third product is determined based on the first activation bit and a third input data bit of the input data bits of the first data matrix populated in the third processing element.

11. The system of claim 9, wherein the shift manager component:
shifts, during the matrix multiplication in a third time step, the second partial sum of the third data matrix from the first processing element to a second processing element along the second dimension;

shifts, matrix into the first processing element;
shifts, during the matrix multiplication in the third time step, a third activation bit from the second data matrix into the first processing element;
shifts, during the matrix multiplication in the third time step, a fourth activation bit from the second data matrix into the second processing element; and
shifts, during the matrix multiplication in a third time step, the second activation bit from the first processing element to the third processing element along the first dimension.

12. The system method of claim 11, wherein the computation component determines, during the matrix multiplication in the third time step, at the first processing element, a fourth partial sum of the third data matrix based on a fourth sum that comprises a fourth product and the third initial value of the third data matrix, wherein the fourth product is determined based on the third activation bit and the first input data bit.

13. The system method of claim 11, wherein the computation component determines, during the matrix multiplication in the third time step, at the third processing element, a fifth partial sum of the third data matrix based on a fifth sum that comprises a fifth product and the third partial sum of the third data matrix, wherein the fifth product is determined based on the second activation bit and the fourth input data bit of the input data bits of the first data matrix populated in the third processing element.

14. The system method of claim 11, wherein the computation component determines, during the matrix multiplication in the third time step, at the second processing element, a sixth partial sum of the third data matrix based on a sixth sum that comprises a sixth product and the second partial sum of the third data matrix, wherein the sixth product is determined based on the fourth activation bit and a fifth input data bit of the input data bits of the first data matrix populated in the second processing element.

15. A computer program product for facilitating matrix multiplication on a systolic array structure, the computer program product comprising a computer readable storage medium having program instructions embodied therewith, the program instructions executable by a processing component to cause the processing component to:
populate respective first registers and respective second registers of all processing elements of a systolic array structure with respective different input data bits of a first data matrix, wherein the processing elements comprise a first processing element that comprises a first input data bit of the input data bits of the first data matrix, a second input data bit of the input data bits of the first data matrix, and a first activation bit of a second data matrix, and wherein the systolic array structure comprises a first dimension and a second dimension of the processing elements, and the respective input data bits of the first data matrix are maintained in the respective first registers and respective second registers while a matrix multiplication of the first data matrix and the second data matrix is completed;
determine, during the matrix multiplication in a first time step, at the first processing element, a first partial sum of a third data matrix based on a first sum that comprises a first product and a first initial value of the third data matrix, wherein the first product is determined based on the first activation bit and the first input data bit.

16. The computer program product of claim 15, wherein the program instructions further cause the processing component to:
shift, during the matrix multiplication in a second time step, the first activation bit from the first processing element to a third processing element along the first dimension;
shift, during the matrix multiplication in the second time step, a second activation bit from the second data matrix into the first processing element; and
determine, during the matrix multiplication in the second time step, at the first processing element, a second partial sum of the third data matrix based on the first sum and a second product determined based on the second activation bit and the second input data bit.

17. The computer program product of claim 16, wherein the program instructions further cause the processing component to:
shift, during the matrix multiplication in the second time step, a second initial value of the third data matrix into the third processing element;
determine, during the matrix multiplication in the second time step, at the second processing element, a third partial sum of the third data matrix based on a third sum that comprises a third product and second initial value of the third data matrix, wherein the third product is determined based on the first activation bit and a third input data bit of the input data bits of the first data matrix populated in the third processing element.

18. The computer program product of claim 16, wherein the program instructions further cause the processing component to:
shift, during the matrix multiplication in a third time step, the second partial sum of the third data matrix from the first processing element to a second processing element along the second dimension;
shift, during the matrix multiplication in the third time step, a third initial value of the third data matrix into the first processing element;
shift, during the matrix multiplication in the third time step, a third activation bit from the second data matrix into the first processing element;
shift, during the matrix multiplication in the third time step, a fourth activation bit from the second data matrix into the second processing element; and
shift, during the matrix multiplication in a third time step, the second activation bit from the first processing element to the third processing element along the first dimension.

19. The computer program product of claim 18, wherein the program instructions further cause the processing component to:
determine, during the matrix multiplication in the third time step, at the first processing element, a fourth partial sum of the third data matrix based on a fourth sum that comprises a fourth product and the third initial value of the third data matrix, wherein the fourth product is determined based on the third activation bit and the first input data bit.

20. The computer program product of claim 18, wherein the program instructions further cause the processing component to:
determine, during the matrix multiplication in the third time step, at the third processing element, a fifth partial sum of the third data matrix based on a fifth sum that comprises a fifth product and the third partial sum of the third data matrix, wherein the fifth product is determined based on the second activation bit and the fourth input data bit of the input data bits of the first data matrix populated in the third processing element; and determine, during the matrix multiplication in the third time step, at the second processing element, a sixth partial sum of the third data matrix based on a sixth sum that comprises a sixth product and the second partial sum of the third data matrix, wherein the sixth product is determined based on the fourth activation bit and a fifth input data bit of the input data of the first data matrix populated in the second element.

* * * * *